(12) United States Patent
Nakabayashi et al.

(10) Patent No.: US 11,709,466 B2
(45) Date of Patent: Jul. 25, 2023

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Ryota Nakabayashi, Toyota (JP); Naoki Yamada, Toyota (JP); Daigo Fujii, Tsushima (JP); Atsushi Ikegaya, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 197 days.

(21) Appl. No.: 17/215,119

(22) Filed: Mar. 29, 2021

(65) Prior Publication Data
US 2021/0311443 A1    Oct. 7, 2021

(30) Foreign Application Priority Data

Apr. 3, 2020   (JP) .................................. 2020-067914

(51) Int. Cl.
*G05B 15/02* (2006.01)
*H04L 12/28* (2006.01)
(Continued)

(52) U.S. Cl.
CPC ............. *G05B 15/02* (2013.01); *B60W 30/06* (2013.01); *B60W 40/12* (2013.01); *G08G 1/207* (2013.01);
(Continued)

(58) Field of Classification Search
CPC .......... B60W 2510/244; B60W 30/06; B60W 40/12; E04H 6/422; G05B 15/02;
(Continued)

(56) References Cited

U.S. PATENT DOCUMENTS

2003/0002963 A1* 1/2003 Stokes ...................... E04H 6/22
                                                                 414/253
2008/0051951 A1* 2/2008 Camacho ................ E04H 6/422
                                                                 701/23
(Continued)

FOREIGN PATENT DOCUMENTS

CN    106451595 A    2/2017
CN    206907231 U    1/2018
(Continued)

OTHER PUBLICATIONS

Kim et al. proof of Concept of Home IoT Connected Vehicles, Apr. 22, 2017, Sensors, p. 1-13. (Year: 2017).*

*Primary Examiner* — Kidest Bahta
(74) *Attorney, Agent, or Firm* — Sughrue Mion, PLLC

(57) ABSTRACT

An information processing apparatus according to the present disclosure includes a controller configured to execute acquiring operation information for a network-connected home appliance that is home electronic equipment which is provided in a dwelling house, and is configured to be accessible to a prescribed network and is capable of being controlled via the network, making an estimation as to entering/exiting of a vehicle utilized by a user of the dwelling house into/from a parking lot associated with the dwelling house on the basis of the operation information for the network-connected home appliance in the dwelling house, and issuing, to a management apparatus that manages
(Continued)

entering/exiting of the vehicle, an enter/exit instruction for causing the vehicle to enter or exit if entering/exiting of the vehicle into/from the parking lot is estimated.

15 Claims, 17 Drawing Sheets

(51) Int. Cl.
  *G08G 1/00* (2006.01)
  *H04L 67/12* (2022.01)
  *B60W 30/06* (2006.01)
  *B60W 40/12* (2012.01)

(52) U.S. Cl.
  CPC ........ *H04L 12/283* (2013.01); *H04L 12/2825* (2013.01); *H04L 67/12* (2013.01); *B60W 2510/244* (2013.01); *H04L 2012/2841* (2013.01)

(58) Field of Classification Search
  CPC .... G06Q 2240/00; G06Q 50/30; G08G 1/207; H04L 12/2825; H04L 12/283; H04L 12/2834; H04L 2012/2841; H04L 67/12; H04L 67/125
  See application file for complete search history.

(56) References Cited

U.S. PATENT DOCUMENTS

| | | | |
|---|---|---|---|
| 2011/0218650 A1* | 9/2011 | Crucs ..................... | G05B 11/01 700/13 |
| 2012/0043935 A1* | 2/2012 | Dyer ....................... | B60L 50/40 320/109 |
| 2012/0286740 A1* | 11/2012 | Loudot ............... | H02J 7/00714 320/137 |
| 2015/0061592 A1* | 3/2015 | Nakasone ............... | B60L 53/14 320/109 |
| 2017/0036557 A1 | 2/2017 | Tsuchiya | |
| 2019/0147368 A1* | 5/2019 | Pinel ................... | G08G 1/0129 706/12 |
| 2019/0347934 A1* | 11/2019 | Hase ..................... | G05D 1/0022 |
| 2020/0234590 A1* | 7/2020 | Ma .......................... | G06F 9/451 |
| 2020/0290649 A1 | 9/2020 | Yamane et al. | |

FOREIGN PATENT DOCUMENTS

| | | |
|---|---|---|
| JP | 11-280282 A | 10/1999 |
| JP | 2020149233 A1 | 9/2020 |

\* cited by examiner

Fig. 4

LIVING ROOM

| NETWORK-CONNECTED HOME APPLIANCE | OPERATION INFORMATION | ACQUISITION TIMING |
|---|---|---|
| AIR CONDITIONER | OFF | THIS OCCASION |
| TELEVISION | OFF | PREVIOUS OCCASION |
| LIGHT | OFF | THIS OCCASION |
| ... | ... | ... |

STUDY

| NETWORK-CONNECTED HOME APPLIANCE | OPERATION INFORMATION | ACQUISITION TIMING |
|---|---|---|
| AIR CONDITIONER | OFF | PREVIOUS OCCASION |
| LIGHT | OFF | PREVIOUS OCCASION |
| ... | ... | ... |

LAVATORY

| NETWORK-CONNECTED HOME APPLIANCE | OPERATION INFORMATION | ACQUISITION TIMING |
|---|---|---|
| DRIER | OFF | PREVIOUS OCCASION |
| LIGHT | OFF | PREVIOUS OCCASION |
| ... | ... | ... |

LIVING ROOM

| NETWORK-CONNECTED HOME APPLIANCE | OPERATION INFORMATION | ACQUISITION TIMING |
|---|---|---|
| AIR CONDITIONER | ON | PREVIOUS OCCASION |
| TELEVISION | OFF | PREVIOUS OCCASION |
| LIGHT | ON | PREVIOUS OCCASION |
| ... | ... | ... |

STUDY

| NETWORK-CONNECTED HOME APPLIANCE | OPERATION INFORMATION | ACQUISITION TIMING |
|---|---|---|
| AIR CONDITIONER | OFF | PREVIOUS OCCASION |
| LIGHT | OFF | PREVIOUS OCCASION |
| ... | ... | ... |

LAVATORY

| NETWORK-CONNECTED HOME APPLIANCE | OPERATION INFORMATION | ACQUISITION TIMING |
|---|---|---|
| DRIER | ON | THIS OCCASION |
| LIGHT | ON | PREVIOUS OCCASION |
| ... | ... | ... |

Fig. 16

| LIVING ROOM | | |
|---|---|---|
| NETWORK-CONNECTED HOME APPLIANCE | OPERATION INFORMATION | ACQUISITION TIMING |
| AIR CONDITIONER | ON | THIS OCCASION |
| TELEVISION | OFF | PREVIOUS OCCASION |
| LIGHT | ON | PREVIOUS OCCASION |
| ... | ... | ... |

| STUDY | | |
|---|---|---|
| NETWORK-CONNECTED HOME APPLIANCE | OPERATION INFORMATION | ACQUISITION TIMING |
| AIR CONDITIONER | OFF | PREVIOUS OCCASION |
| LIGHT | OFF | PREVIOUS OCCASION |
| ... | ... | ... |

| LAVATORY | | |
|---|---|---|
| NETWORK-CONNECTED HOME APPLIANCE | OPERATION INFORMATION | ACQUISITION TIMING |
| DRIER | ON | PREVIOUS OCCASION |
| LIGHT | ON | PREVIOUS OCCASION |
| ... | ... | ... | ing apparatus, an information processing method, and a non-transitory storage medium.

INFORMATION PROCESSING APPARATUS, INFORMATION PROCESSING METHOD, AND NON-TRANSITORY STORAGE MEDIUM

CROSS REFERENCE TO THE RELATED APPLICATION

This application claims the benefit of Japanese Patent Application No. 2020-067914, filed on April 3, 2020, which is hereby incorporated by reference herein in its entirety.

BACKGROUND

Technical Field

The present disclosure relates to an information processing apparatus, an information processing method, and a non-transitory storage medium.

Description of the Related Art

Patent Document 1 discloses a technique relating to a multistory parking lot entering/exiting preparation system which drives a vehicle transport mechanism of a parking lot on the basis of communication between a wireless apparatus provided in the parking lot and a wireless apparatus provided in a vehicle under contract with the parking lot or a wireless apparatus held by a utilizer of the vehicle. According to the technique, when the wireless apparatus in the parking lot receives a signal transmitted from a wireless apparatus in the vehicle, the wireless apparatus predicts that the vehicle is approaching the parking lot. When the wireless apparatus in the parking lot receives a signal transmitted from a wireless apparatus held by a utilizer of a vehicle, the wireless apparatus predicts that the utilizer is approaching the parking lot.

Citation List

Patent Document

[Patent Document 1] Japanese Patent Laid-Open No. 11-280282

SUMMARY

It is an object of the present disclosure to enhance user convenience for entering of a vehicle into a parking lot and/or exiting of a vehicle from a parking lot.

An information processing apparatus according to the present disclosure includes a controller configured to execute acquiring operation information for at least one network-connected home appliance that is home electronic equipment which is provided in a dwelling house, and is configured to be accessible to a prescribed network and is capable of being controlled via the network, making an estimation as to entering/exiting of a vehicle utilized by a user of the dwelling house into/from a parking lot associated with the dwelling house on the basis of the operation information for the at least one network-connected home appliance in the dwelling house, and issuing, to a management apparatus that manages entering/exiting of the vehicle an enter/exit instruction for causing the vehicle to enter or exit if entering/exiting of the vehicle into/from the parking lot is estimated.

The present disclosure can also be viewed from an aspect of a computer-based information processing method. That is, an information processing method according to the present disclosure comprises executing by a computer acquiring operation information for at least one network-connected home appliance that is home electronic equipment which is provided in a dwelling house, and is configured to be accessible to a prescribed network and is capable or being controlled via the network, making an estimation as to entering/exiting of a vehicle utilized by a user of the dwelling house into/from a parking lot associated with the dwelling house on the basis of the operation information for the at least one network-connected home appliance in the dwelling house, and issuing, to a management apparatus that manages entering/exiting of the vehicle, an enter/exit instruction for causing the vehicle to enter or exit if entering/exiting of the vehicle into/from the parking lot is estimated.

The present disclosure can also be viewed from an aspect of a non-transitory storage medium storing an information processing program. That is, an information processing program stored in a non-transitory storage medium according to the present disclosure causes a computer to execute acquiring operation information for at least one network-connected home appliance that is home electronic equipment which is provided in a dwelling house, and is configured to be accessible to a prescribed network and is capable of being controlled via the network, making an estimation as to entering/exiting of a vehicle utilized by a user of the dwelling house into/from a parking lot associated withy the dwelling house on the basis of the operation information for the at least one network-connected home appliance in the dwelling house, and issuing, to a management apparatus that manages entering/exiting of the vehicle, an enter/exit instruction for causing the vehicle to enter or exit if entering/exiting of the vehicle into/from the parking lot is estimated.

The present disclosure allows enhancement of user convenience for entering of a vehicle into a parking lot and/or exiting of a vehicle from a parking lot.

BRIEF DESCRIPTION OF DRAWINGS

FIG. 4 is a first view illustrating by example pieces of operation information for network-connected home appliances which are acquired by an acquisition unit and stored in a storage, according to the first embodiment;

FIG. 5 is a second view illustrating by example pieces of operation information for the network-connected home appliances which are acquired by the acquisition unit and stored in the storage, according to the first embodiment;

FIG. 16 is a view illustrating by example pieces of operation information for network-connected home appliances which are acquired by an acquisition unit and stored in a storage, according to the second embodiment.

DESCRIPTION OF THE EMBODIMENTS

In the present disclosure, a controller acquires operation information for a network-connected. home appliance. The network-connected home appliance here is home electronic equipment that is provided in a dwelling house and is configured to be accessible to a prescribed network. Such a network-connected home appliance can be controlled via the prescribed network. The prescribed network here may be the Internet or a home network that is connected to the Internet. The controller makes an estimation as to entering/exiting of a vehicle utilized by a user of the dwelling house on the basis of the acquired operation information for the network-connected home appliance. The entering/exiting of the vehicle here refers to exiting of the vehicle from a parking lot associated with the dwelling house or entering of the vehicle into the parking lot.

The controller issues, to a management apparatus that manages entering/exiting of the vehicle, an enter/exit instruction for causing the vehicle to enter or exit entering/exiting of the vehicle into/from the parking lot associated with the dwelling house is estimated. For example, if the parking lot associated with the dwelling house here is a mechanical parking lot that is provided in a multiple dwelling house which is a collection of dwelling houses, the management apparatus is provided with a vehicle transport mechanism for transporting the vehicle in the parking lot, and an instruction for activating the vehicle transport mechanism is included in the above-described enter/exit instruction.

As described above, since an information processing apparatus according to the present disclosure issues an enter/exit instruction for causing a vehicle to enter or exit on the basis of operation information for a network-connected home appliance, a waiting time period for a user when a vehicle is caused to enter into a parking lot or exit from a parking lot is made short as possible. This allows enhancement of user convenience for entering/exiting of a vehicle into/from a parking lot.

Embodiments of the present disclosure will be described below with reference to the drawings. Configurations of the embodiments below are illustrative only, and the present disclosure is not limited to the configurations of the embodiments.

First Embodiment

Figure 1:
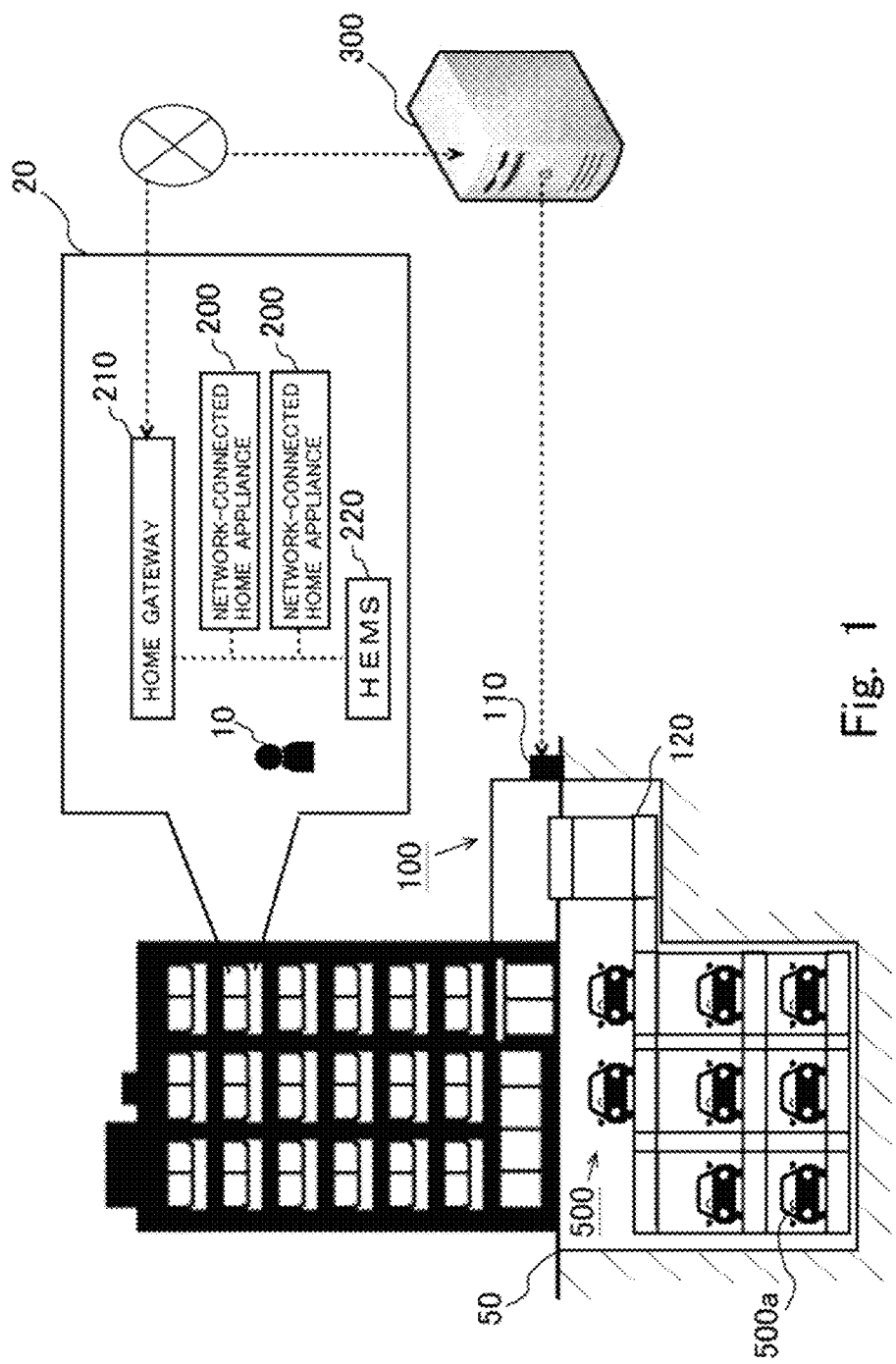
FIG. 1 is a diagram illustrating a schematic configuration of an information processing system according to a first embodiment.

An overview of an information processing system according to a first embodiment will be described with reference to FIG. 1. The information processing system according to the present embodiment is configured to include a management apparatus 100 that manages entering/exiting of a vehicle 500 which is parked in a parking lot 50, network-connected home appliances 200 that are provided in a dwelling house 20, and a server 300. The parking lot 50 here is a parking lot that is associated with the dwelling house 20. Specifically, the parking lot 50 is a mechanical parking lot that is provided in a basement of a multiple dwelling house which is a collection of dwelling houses 20 and is a parking lot that is made available for parking of the vehicle 500 utilized by a user 10 of the dwelling house 20.

The management apparatus 100 is configured to include a parking lot terminal 110 and a vehicle transport mechanism 120. As described above, the parking lot 50 according to the present embodiment is a basement mechanical parking lot. For example, if the vehicle 500 parked in the parking lot 50 is to exit from the parking lot, the vehicle 500 is transported to a place for getting on and off on the ground by the vehicle transport mechanism 120, which allows the vehicle to exit. Note that although the vehicle transport mechanism 120 is configured to have a pallet with the vehicle 500 mounted thereon, a storage shelf for the vehicle 500, a transfer mechanism for transferring the pallet, and the like, any type may be adopted as long as the vehicle transport mechanism 120 can transport the vehicle 500 from a storage place in the basement to the place for getting on and off on the ground. The vehicle transport mechanism 120 is controlled by the parking log terminal 110.

The network-connected home appliance 200 is home electronic equipment that is provided in the dwelling house 20 and is connected to be accessible to a home network that is composed of a home gateway 210. The home gateway 210 is configured to be accessible to the Internet. The network-connected home appliances 200 and the home gateway 210 may be connected by wire via Ethernet (R) or the like or wirelessly connected via Wi-Fi (R) or the like. The above-described configuration which the network-connected home appliances 200 are configured to be accessible to the Internet via the home gateway 210 allows control of the network-connected home appliances 200 via the Internet. A HEMS 220 is connected to the home network composed of the home gateway 210. HEMS stands for Home Energy Management System, and the HEMS 220 can manage use of energy (e.g., electric power) in the dwelling house 20. For this reason, the HEMS 220 can monitor power consumption of the network-connected home appliances 200 connected to the home network.

The server 300 is configured to be capable of communication with the home gateway 210 via the Internet and can acquire data transmitted from the network-connected home appliances 200 and the HEMS 220 connected to the home network composed of the home gateway 210. Examples of the data here include information on a status of manipulation of the network-connected home appliance 200 by the user 10 of the dwelling house 20 and information on power consumption of the network-connected home appliance 200 that is monitored by the HEMS 220. The server 300 is also configured to be capable of communication with the management apparatus 100 and can transmit a prescribed instruction to the management apparatus 100.

As described above, the server 300 configured to be capable of communication with the home gateway 210 acquires operation information for each network-connected home appliance 200. The operation information for the network-connected home appliance 200 here is information representing as operating state of the network-connected home appliance 200 and is acquired, for example, on the basis of information on the status of manipulation of the network-connected home appliance 200 by the user 10. The server 300 makes an estimation as to entering/exiting of the vehicle 500 into/from the parking lot 50 on the basis of the acquired pieces of operation information. Here, in the present embodiment, the server 300 estimates whether the vehicle 500 is to exit from the parking lot 50. At this time, the server 300 may estimate whether the vehicle 500 is to exit from the parking lot 50, on the basis of a pattern of manipulation of the network-connected home appliances 200 to be performed before leaving home by the user 10 which is predetermined manipulation. Alternative the server 300 may estimate whether the vehicle 500 is to exit from the parking lot 50, on the basis of a pattern of manipulation of the network-connected home appliances 200 to be performed before leaving home by the user 10 which is manipulation learned as manipulation peculiar to the user 10.

If it is estimated that the vehicle 500 is to exit from the parking lot 50, the server 300 issues an exit instruction for causing the vehicle 500 to exit to the management apparatus 100. In the present embodiment, the management apparatus 100, to which the exit instruction is transmitted from the server 300, controls the vehicle transport mechanism 120 via the parking lot terminal 110, thereby putting the vehicle 500 into a state on standby for exiting. Note that the state on standby for exiting refers to a state where the vehicle 500 can be immediately transported from the parking lot 50 in the basement to the place for getting on and off on the ground, as will be described later.

Figure 2:
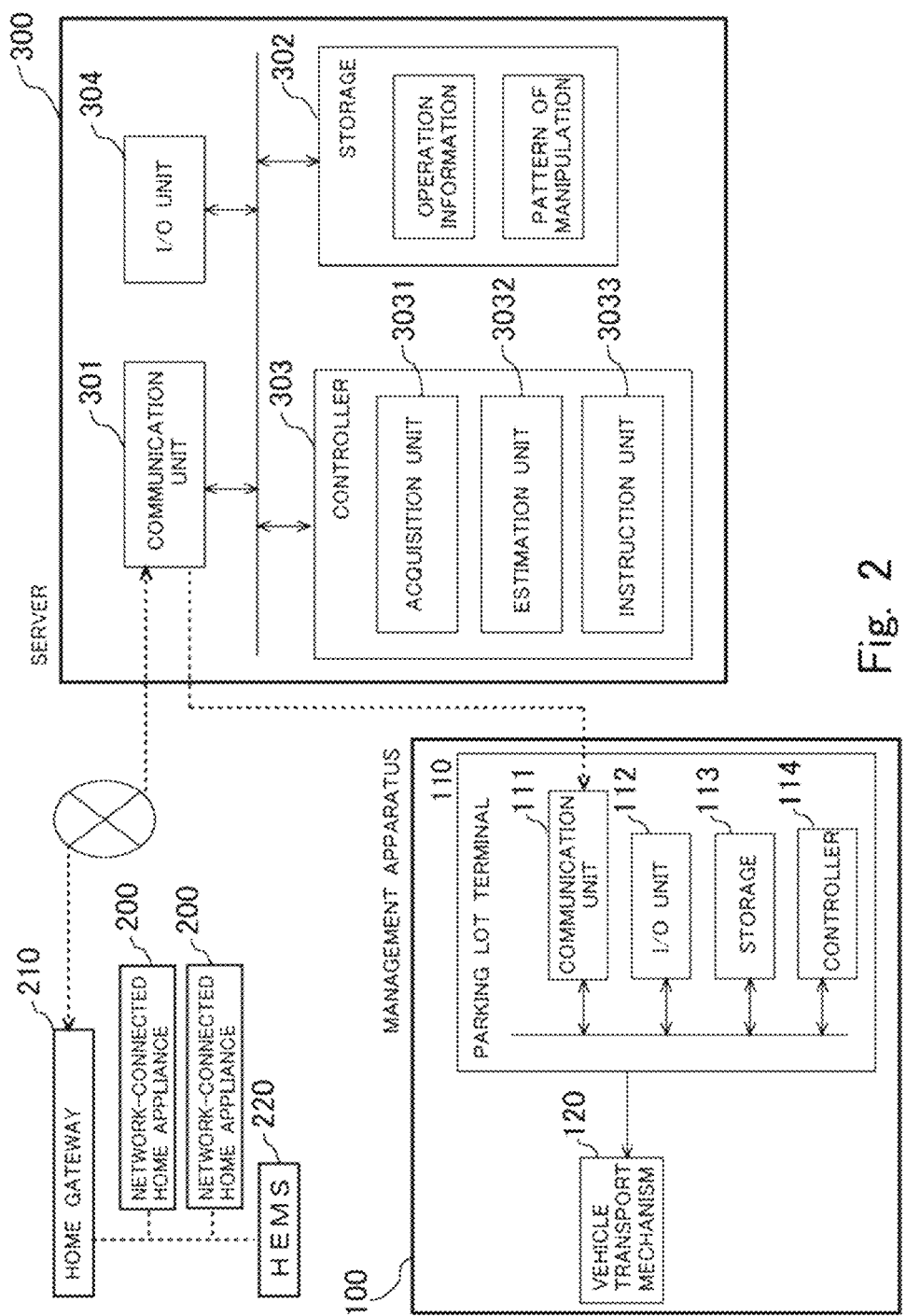
FIG. 2 is a diagram illustrating, in more detail, constituent elements of the information processing system according to the first embodiment.

A detailed description of constituent elements of the server 300 will be mainly given with reference to FIG. 2. FIG. 2 is a diagram illustrating, in more detail, the constituent elements of the server 30 included in the information processing system and illustrating constituent elements of the management apparatus 100 that communicates with the server 300, according to the first embodiment, The server 300 may be composed of general-purpose computer. That is, the server 300 can be configured as a computer having a processor, such as a CPU or a GPU, a main memory, such as a RAM or a ROM, and an auxiliary memory, such as an EPROM, a hard disk drive, or a removable medium. Note that the removable medium may be, for example, a USB memory or a disk recording medium, such: as a CD or a DVD. An operating system (OS), various types of programs, various types of tables, and the like are stored in the auxiliary memory. The server 300 has, as functional units, a communication unit 301, a storage 302, a controller 303, and I/O unit 304. The server 300 loads the programs stored in the auxiliary memory Into a work region of the main memory and executes the programs, and the functional units and the like are controlled through the execution of the programs, thereby allowing implementation of functions fitting prescribed purposes for the functional units. Note that one(s) or all of the functions may be implemented by a hardware circuit, such as an ASIC or an FPGA, The communication unit 301 here is a communication interface for connecting the server 300 to a network. The communication unit 301 is configured to include, for example, a network interface board and a wireless communication circuit for wireless communication. The server 300 is connected to the management apparatus 100, the home gateway 210 (including the home network composed thereof), and any other external apparatus via the communication unit 301 so as to be capable of communication.

The storage 302 is configured to include a main memory and an auxiliary memory. The main memory is a memory where a program to be executed by the controller 303 and data to be utilized by the control program are developed. The auxiliary memory is a device where a program to be executed by the controller 303 and data to be utilized by the control program are stored.

Additionally, the storage 302 stores pieces of data that are transmitted from the network-connected home appliance 200, the HEMS 220, and the like via the home gateway 210. Note that the server 300 acquires these pieces of data via the communication unit 301. Pieces of operation information for the network-connected home appliances 200, a pattern of manipulation of the network-connected home appliances 200 to be performed before leaving home by the user 10, and the like which are acquired on the basis of the pieces of data are also stored in the storage 302.

The controller 303 is a functional unit that is responsible for control to be performed by the server 300. The controller 303 can he implemented by an arithmetic processing unit, such as a CPU. The controller 303 is configured to further have the three functional units: an acquisition unit 3031; an estimation unit 3032; and an instruction unit 3033. The functional units may be implemented by executing the stored programs by the CPU.

The acquisition unit 3031 acquires, via the home gateway 210, pieces of operation information representing the operating states of the network-connected home appliances 200 on the basis of pieces of information transmitted from the network-connected home appliances 200, a prescribed controller available for manipulation of the network-connected home appliances, the HEMS 220, and the like. This will be described with reference to FIG. 3.

Figure 3:
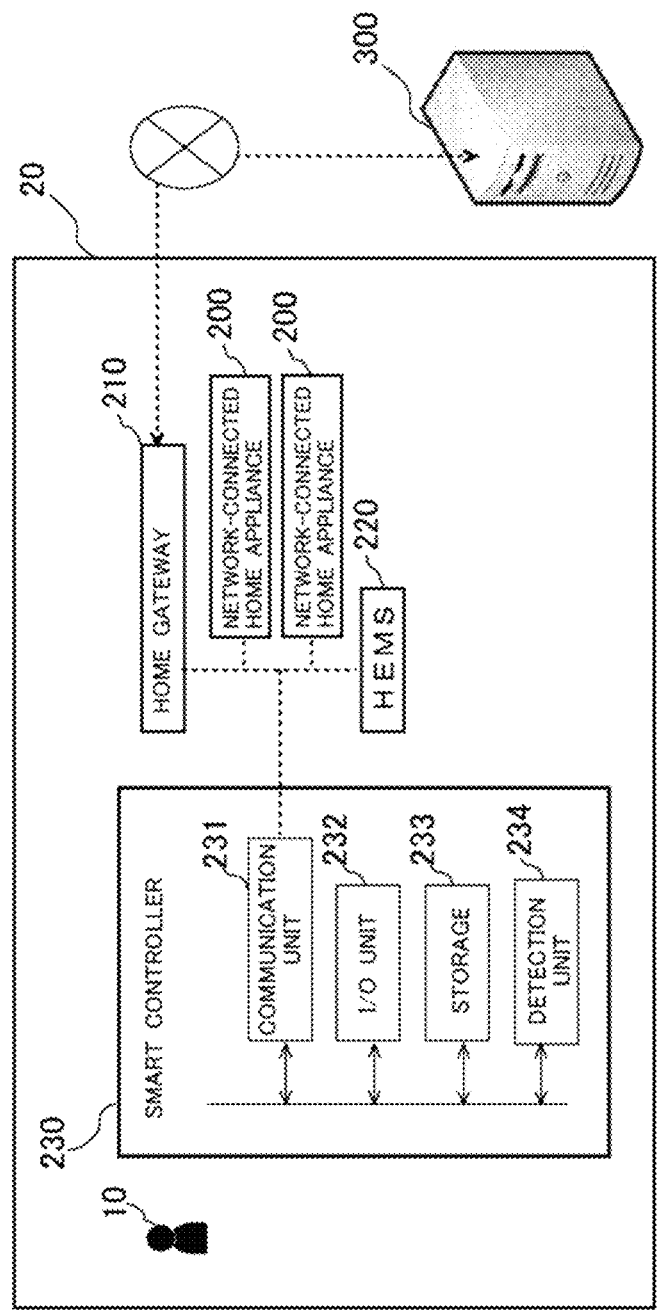
FIG. 3 is a diagram for explaining an example where information on a status of manipulation or a network-connected home appliance by a user is transmitted to a server.

FIG. 3 is a diagram for explaining an example where information on the status of manipulation of the network-connected home appliance 200. Referring to FIG. 3, the transmitted to the server 200. Referring to FIG. 3, the user 10 manipulates the network-connected home appliance 200 using a smart controller 230. information on the status of manipulation of the network-connected home appliance 200 by the user 10 is then transmitted from the smart controller 230 to the server 300 via the home gateway 210. The smart controller 230 here is a controller which allows manipulation of the network-connected home appliances 200. Although the smart controller 230 has, as functional units, a combination unit 231, an I/O unit 232, a storage 233, and a detection unit 234, as illustrated in FIG. 3, the smart controller 230 may have a functional unit other than the units. The communication unit 231 is a communication interface for connecting the smart controller 230 to a network and is configured to include, for example, a network interface board and a wireless communication circuit for wireless communication. The I/O unit 232 is a functional unit for inputting information on an instruction manipulation addressed to the network-connected home appliance 200 from the user 10 at the time of transmission of the instruction for manipulation via the communication unit 231 and is touch panel. The storage 233 is configured device and a touch panel. The storage 233 is configured to include a main memory and an auxiliary memory, like the storage 302 of the server 300, and the network-connected home appliances 200 to be manipulated by the smart controller 230 are registered in the storage 233. Note that the registration of the network-connected home appliances 200 is performed beforehand through a prescribed application. The detection unit 234 is a functional unit for detecting an instruction for manipulation issued to the network-connected home appliance 200 via the I/O unit 232 by the user 10. In this case, the detection unit 234 of the smart controller 230 corresponds to a first sensor according to the present disclosure.

In the above-described case, when the user 10 inputs information on an instruction for manipulation addressed to the network-connected home appliance 200 to the I/O unit 232, the instruction for manipulation is transmitted from the communication unit 231 to the network-connected home appliance 200 via the home network. This allows control of the network-connected home appliance 200 via the home network. At this time, the information on the instruction for manipulation detected by the detection unit 234 is transmitted from the communication unit 231 to the server 300 via the home gateway 210. That is, information on the status of manipulation of the network-connected home appliance 200 by the user 10 is transmitted from the smart controller 230 to the server 300 via the home gateway 210. The acquisition unit 3031 acquires the information on the status of manipulation transmitted from the smart controller 230. Note that the information includes information that the user 10 has performed manipulation of activating the network-connected home appliance 200, information that the user 10 has performed manipulation of stopping the network-connected home appliance 200, or the like. The acquisition unit 3031 can then acquire operation information for the network-connected home appliance 200 on the basis of the information on the status of manipulation of the network-connected home appliance 200 by the user 10. For example, the acquisition unit 3031 can acquire operation information that the network-connected home appliance 200 is not in operation and that the manipulation has been performed by the user 10, on the basis of information that the user 10 has performed manipulation of stopping the network-connected connected home appliance 200.

The acquisition unit 3031 may acquire information on the status of manipulation of the network-connected home appliance 200 by the user 10 on the basis of information transmitted from the HEMS 220. As described above, the REMS 220 can monitor the power consumption of each network-connected home appliance 200. Information on the power consumption of the network-connected home appliance 200 detected by the HEMS 220 is transmitted to the server 300 via the home gateway 210. The acquisition unit 3031 can then sense, on the basis of the transmitted information on the power consumption of the network-connected home appliance 200, whether the network-connected home appliance 200 has been activated or stopped. That is, the acquisition unit 3031 can acquire information on the status of manipulation of the network-connected home appliance 200 by the User 10, Note that, in this case, the HEMS 220 corresponds to a second sensor according to the present disclosure.

Referring back to FIG. 2, the estimation unit 3032 that the controller 303 of the sever 300 has estimates whether the vehicle 500 is to exit from the parking lot 50, on the basis of pieces of operation information for the network-connected home appliances 200 which are acquired by the acquisition unit 3031 and stored in the storage 302 and the pattern of manipulation of the network-connected home appliances 200 which is defined in advance as manipulation to be performed before leaving home by the user 10 and stored in the storage 302.

This will be described with reference to FIG. 4.

FIG. 4 is a first view illustrating by example pieces of operation information for the network-connected home appliances 200 which are acquired by the acquisition unit 8031 and stored in the storage 302. In the example in FIG. 4 a plurality of network-connected home appliances 200 which are provided in a living room, a study, and a lavatory in the dwelling house 20, respective pieces of operation information for the network-connected home appliances 200, and acquisition timings which are timings of acquisition of the pieces of operation information are associated and stored in the storage 302. The acquisition timings here will be described. The server 301 periodically communicates with the home network composed of the home gateway 210. When operation information is acquired on the basis of information on the status of manipulation of the network-connected home appliance 200 which is transmitted from the home network, an acquisition timing for the network-connected home appliance 200, operation information for which is acquired, is set to "THIS OCCASION," and acquisition timings for the other network-connected home appliances 200 are set to "PREVIOUS OCCASION." In the example in FIG. 4, manipulations of turning off an air conditioner and a light in the living room which are included in the network-connected home appliances 200 have been performed on this occasion by the user 10.

The pattern of manipulation of the network-connected home appliances 200 to be performed before leaving home by the user 10 is stored in advance in the storage 302. In this case, the estimation unit 3032 can estimate whether the vehicle 500 is to exit from the parking lot 50 by, for example, checking the above-described pieces of operation information illustrated in FIG. 4 against the above-described pattern of manipulation stored in, the storage 302. Assume here that, for example, a pattern in which the air conditioner and the light in the living room are turned off while the network-connected home appliances 200 in the study and the lavatory are off is stored as the pattern of manipulation of the network-connected home appliances 200 to be performed before leaving home by the user 10. In this case, the estimation unit 3032 regards the above-described pieces of operation information illustrated in FIG. 4 as fitting the pattern of manipulation and estimates that the vehicle 500 is to exit from the parking lot 50. Note that, in this case, the air conditioner and the light in the living room each correspond to a first home appliance according to the present disclosure.

Alternatively, the estimation unit 3032 may estimate whether the vehicle 500 is to exit from the parking lot 50, on the basis of pieces of operation information for the network-connected home appliances 200 acquired by the acquisition unit 3031 and stored in the storage 302 and a pattern of manipulation of the network-connected connected home appliances 200 which is learned as peculiar manipulation to be performed before leaving home by the user 10 and stored in the storage 302. This will be described with reference to FIG. 5.

FIG. 5 is a second view illustrating by example pieces of operation information for the network-connected home appliances 200 which are acquired by the acquisition unit 3031 and stored in the storage 302, In the example in FIG. 5, manipulation of turning on a drier in the lavatory which is included in the network-connected home appliances 200 has been performed on this occasion by the user 10. Here, the acquisition unit 3031 can acquire information on a status of manipulation of the drier by the user 10 on the basis of information which is transmitted from the HEMS 220. For example, if high power consumption is detected in a circuit which supplies power to the lavatory, it may be judged that manipulation of turning on the drier has been performed by the user 10. The pattern of manipulation of the network-connected home appliances 200 learned as the peculiar manipulation to be performed before leaving home by the user 10 is stored in the storage 302. In this case, assume that, for example, a tendency for the user 10 to leave home after manipulating the drier is learned as a tendency representing association between pieces of operation information for the network-connected home appliances 200 and information on exiting of the vehicle 500. The estimation unit 3032 regards the above-described pieces of operation information illustrated in FIG. 5 as fitting the pattern of manipulation learned on the basis of past information and estimates that the vehicle 500 is to exit from the parking lot 50.

Referring back to FIG. 2, if it is estimated by the estimation unit 3032 that the vehicle 500 is to exit from the parking lot 50, the instruction unit 3033 that the controller 303 of the server 300 has issues an exit instruction for causing the vehicle 500 to exit to the management apparatus 100. The management apparatus 100 then controls the vehicle transport mechanism 120 via the parking lot terminal 110, thereby putting the vehicle 500 into the state on standby for exiting, this will be described with reference to FIGS. 6 and 7.

The management apparatus 100 here has the parking lot terminal 110 and the vehicle transport mechanism 120. Although the parking to terminal 110 has, as functional units, a communication unit 111, an I/O unit 112, a storage 113, and a controller 114, as illustrated in FIG. 2, the parking lot terminal 110 say have a functional unit other than the units. The communication unit 111 is a communication interface for connecting the management apparatus 100 to a network and is configured to include, for example, a network interface board and a wireless communication circuit for wireless communication. The I/O unit 112 is a functional unit for displaying e.g., information transmitted from the outside via the communication unit 111 and inputting information on an instruction for manipulation for causing the vehicle 500 to exit from the parking lot 50 by the user 10 and is configured to have, for example, a display device and a touch panel. The storage 113 is configured to include a main storage and an auxiliary storage, like the storage 302 of the server 300. User information of the user 10 that utilizes the parking lot 50 is associated with information on a storage shelf on which the vehicle 500 of the user 10 is stored in the parking lot 50 and is registered in the storage 113. Note that the registration of the information is performed beforehand by a prescribed application. The controller 114 is a functional unit for controlling the vehicle transport mechanism 120.

Figure 6:
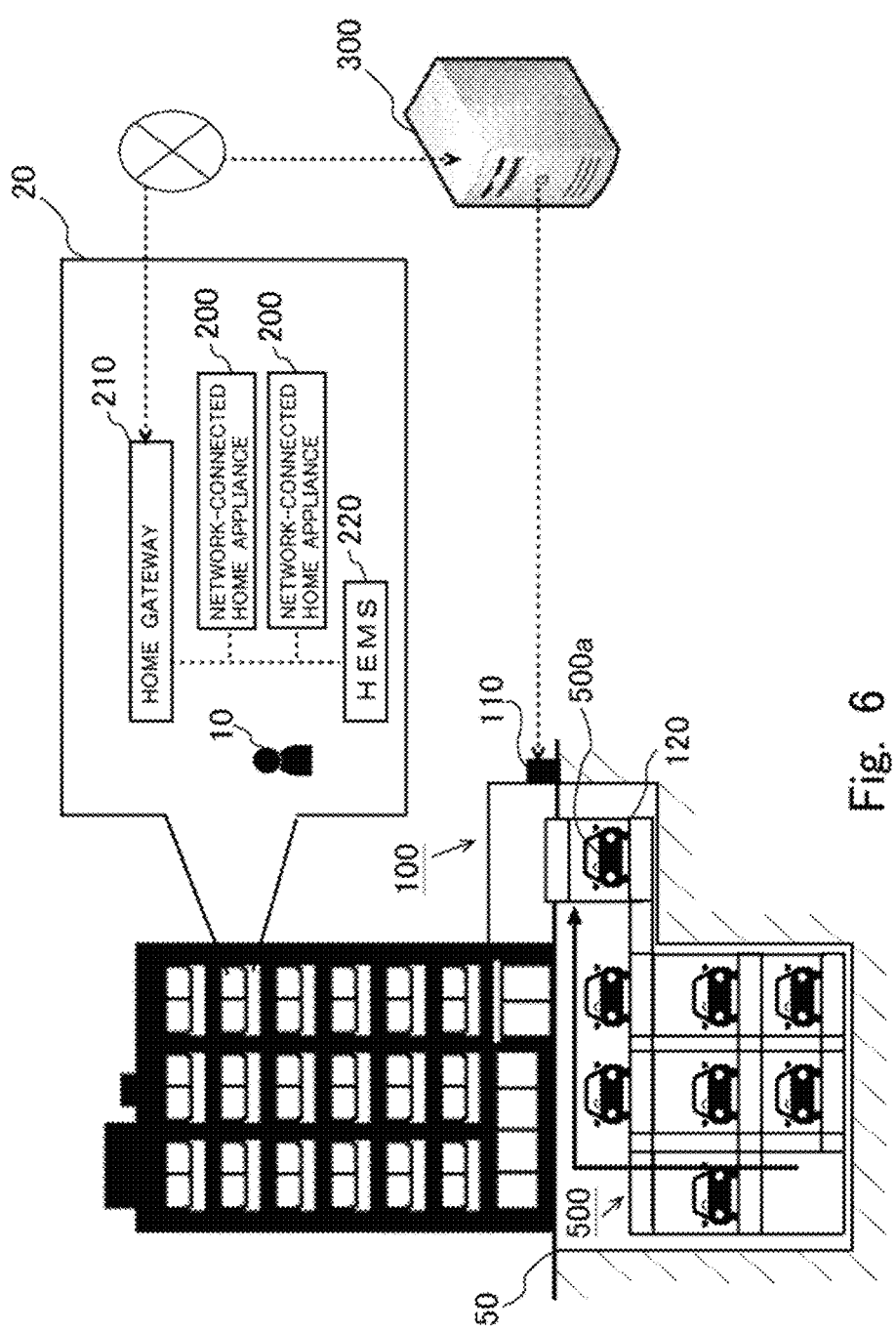
FIG. 6 is a first diagram for explaining a process which a management apparatus after reception of an exit instruction from the server performs in order to cause a vehicle to exit, according to the first embodiment.

FIG. 6 is a first diagram for explaining a process which the management apparatus 100 after reception: of an exit instruction from the server 300 performs in order to cause the vehicle 500 to exit, according to the first embodiment. When the management apparatus 100 receives an exit instruction from the instruction unit 3033 that the controller 303 of the server 300 has, the management apparatus 100 transports a storage shelf which is assigned to a vehicle 500a utilized by the user 10 to waiting space immediately below the place for getting on and off on the ground, using the vehicle transport mechanism 120, as illustrated in FIG. 6. That is, the vehicle 500a is put into the state on standby for exiting. After the vehicle 500a put into the state on standby for exiting as described above, when the user 10 inputs information on an instruction for manipulation for causing the vehicle 500a to exit to the I/O unit 112 of the parking lot terminal 110, as illustrated in FIG. 7, the vehicle 500a is immediately transported from the parking lot 50 in the basement to the place for getting on and off on the ground.

Figure 7:
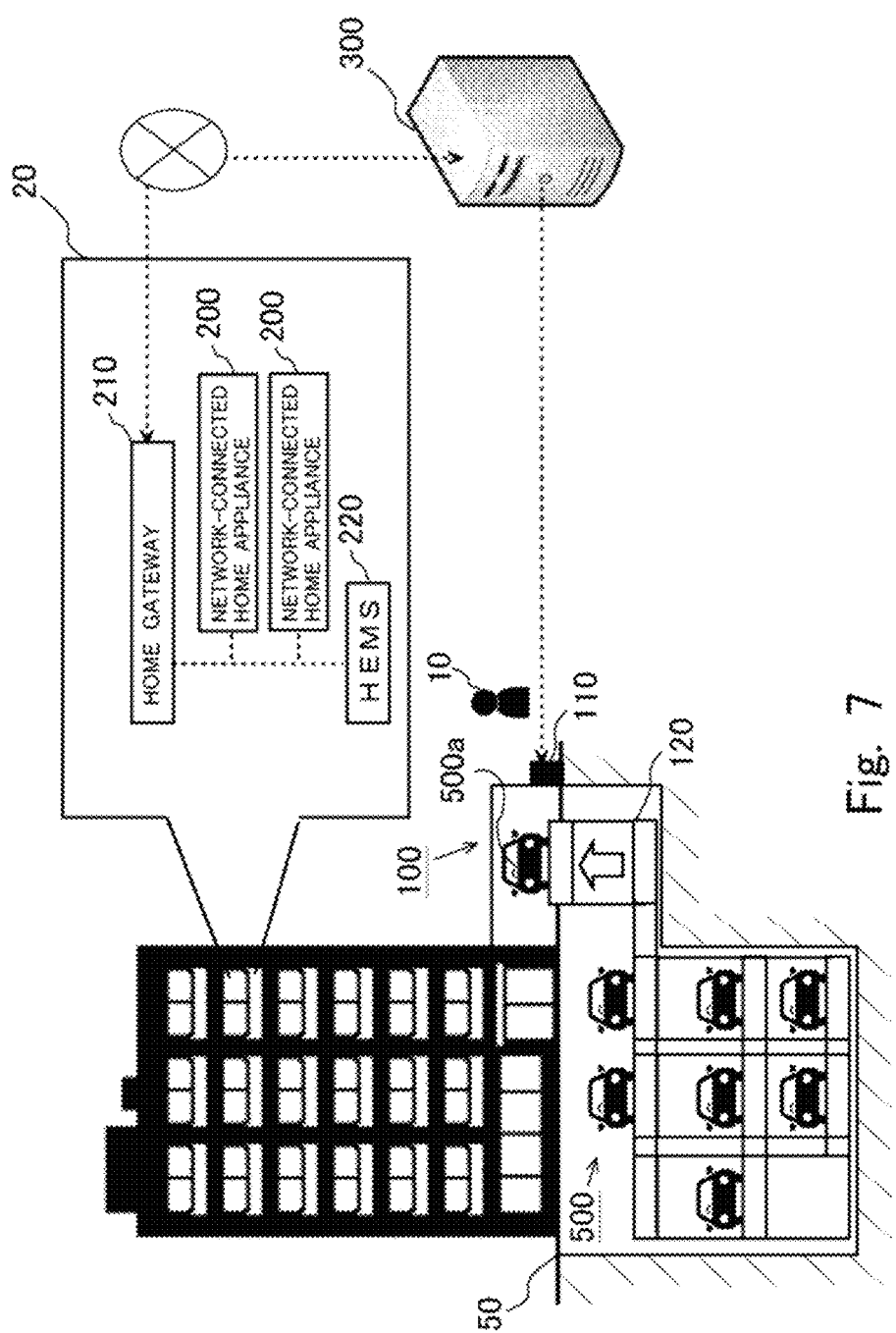
FIG. 7 is a second diagram for explaining the process that the management apparatus after reception of the exit instruction from the server performs in order to cause the vehicle to exit, according to the first embodiment.

Note that FIG. 7 is a second diagram for explaining the process that the management apparatus 100 after reception of the exit instruction from the server 300 performs in order to cause the vehicle 500 to exit, according to the first embodiment. This makes a waiting time period for the user 10 when the vehicle 500a is. caused to exit from the parking lot 50 as short as possible and thus enhances user convenience for entering/exiting of a vehicle into/from a parking lot.

Note that the controller 303 executes processing of the acquisition unit 3031, the estimation unit 3032, and the instruction unit 3033, thereby functioning as a controller according to the present disclosure. The server 300 functions as an information processing apparatus according to the present disclosure.

The I/O unit 304 is an interface for inputting and outputting information. The I/O unit 304 is configured to have, for example, a display device and a touch panel. The I/O unit 304 may include a keyboard, short-range communication means, a touch screen, and the like.

Figure 8:
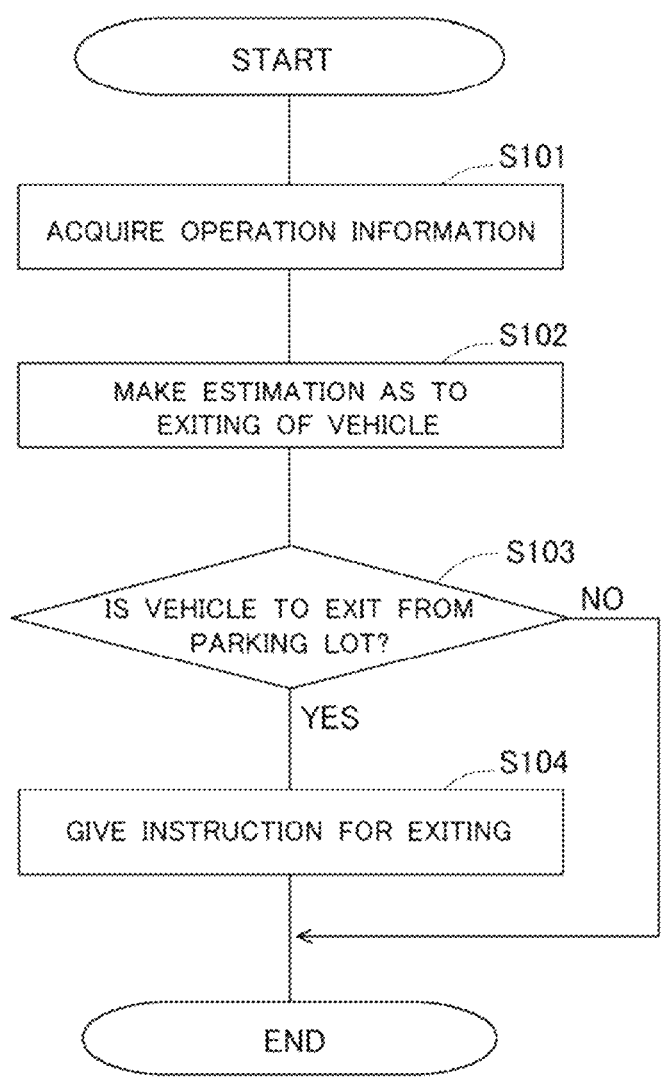
FIG. 8 is a flowchart of a process which the server performs in order to cause a vehicle to exit, according to the first embodiment.

Here, a process which the server 300 according to the first embodiment performs in order to cause the vehicle 500 to exit will be described with reference to the flowchart illustrated in FIG. 8. The process is executed by the controller 303 of the server 300. First in 8101, pieces of operation information for the network-connected home appliance 200 are acquired. The controller 303 acquires the operation information for each network-connected home appliance 200 on the basis of information which is transmitted via the home gateway 210 and relates to the status of manipulation of the network-connected home appliance 200. The controller 303 after the acquisition of the pieces of operation information stores the pieces of operation information in the storage 302 of the server 300. When the process in S101 ends, the process advances to S102

In S102, an estimation as to exiting of the vehicle 500 from the parking lot 50 is made on the basis of the pieces of operation information acquired in the process in S101 and a pattern of manipulation of the network-connected home appliances 200 stored in the storage and whether the vehicle 500 is estimated in the process in 5102 to exit from the parking log 50 is judges in next S103. The pattern of manipulation is a pattern of manipulation of the network-connected home appliances 200 to be performed before leaving home by the user 10, as described above. If the pieces of operation information acquired in the process in S101 fit the pattern of manipulation, the controller 303 estimates that the vehicle 500 is to exit from the parking lot 50. Note that, at this time, the controller 303 may estimate exiting of the vehicle 500 from the parking lot 50 after acquiring a status of parking of the vehicle 500 in the parking lot 50 from the management apparatus 100 for the parking lot 50 and judging that the vehicle 500 of the user 10 is parked in the parking lot 50. If YES in S103, the process advances to S104, If NO in S103, execution of the present flow is ended.

If YES in S103, an exit instruction for causing the vehicle 500 to exit is issued to the management apparatus 100 in next S104. The management apparatus 100 then controls the vehicle transport mechanism 120 via the parking lot terminal 110, as described above, thereby putting the vehicle 500 into the state on standby for The above-described processing makes a waiting time period for the user 10 when the vehicle 500 is caused to exit from the parking lot 50 as short as possible and thus enhances the user convenience for exiting of a vehicle from a parking lot.

<First Modification of First Embodiment>

Figure 9:
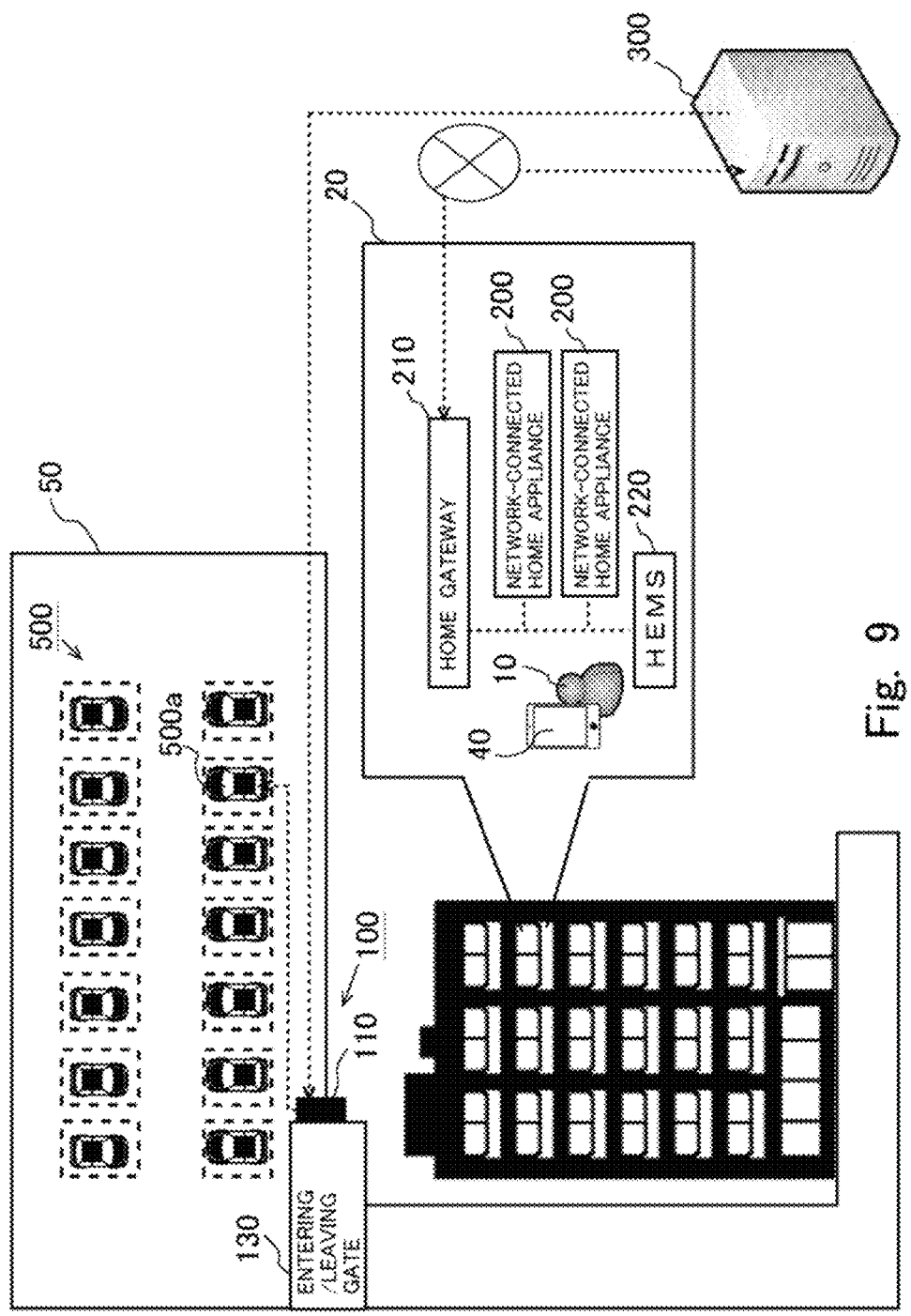
FIG. 9 is a diagram illustrating a schematic configuration of an information processing system according to a first modification of the first embodiment.

A first modification of the above-described first embodiment will be described with reference to FIGS. 9 to 13. FIG. 9 is a diagram illustrating a schematic configuration of an information processing system according to the present modification. The information processing system according to the present modification includes a mobile terminal 40 of the user 10 of the vehicle 500 in addition to the components illustrated in the first embodiment.

The first embodiment has described an example where the vehicle 500 is caused to exit from the mechanical parking lot 50 provided in the basement of the multiple dwelling house that is a collection of the dwelling houses 20. In contrast, the present modification will describe an example where the vehicle 500 is caused to exit from the parking lot 50 provided on the ground through automated running.

Figure 10:
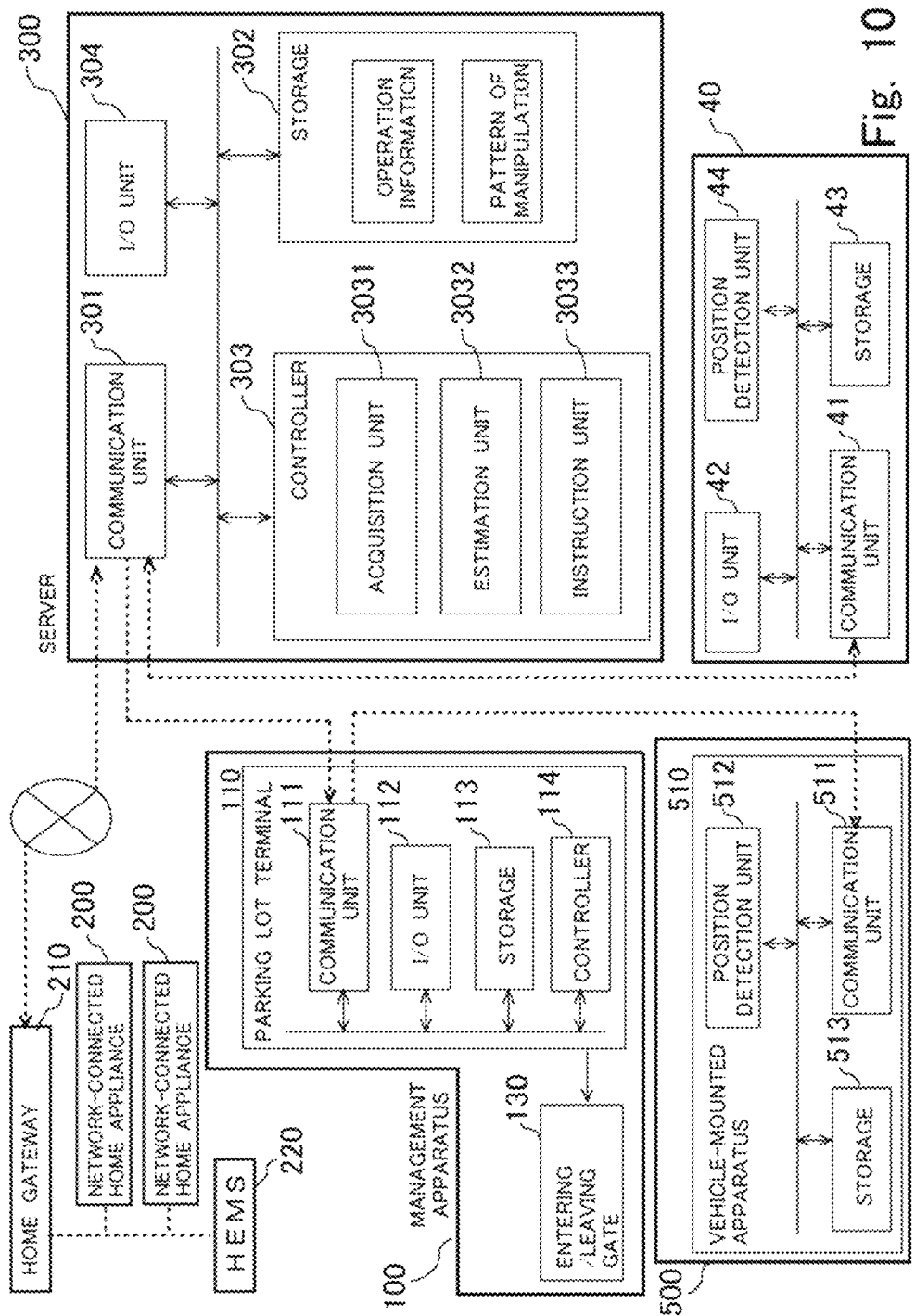
FIG. 10. is a diagram illustrating, in more detail, constituent elements of the information processing system according to the first modification of the first embodiment.

FIG. 10 is a diagram illustrating, in more detail, constituent elements of the management apparatus 100 and the server 300 included in the information processing system and illustrating constituent elements of the mobile terminal 40 and a vehicle-mounted apparatus 510 of the vehicle 500 which communicate with the apparatuses, according to the present modification. As illustrated in FIG. 10, the mobile terminal 40 has, as functional units, a communication unit 41, an I/O unit 42, a storage 43, and a position detection unit 44. The communication unit 41 is a communication interface for connecting the mobile terminal 40 to a network and is configured to include, for example, a network interface board and a wireless communication circuit for wireless communication. The I/O unit 42 is a functional unit for displaying, e.g., information transmitted from the outside via the communication unit 41 and inputting information at the time of transmission of the information to the outside via the communication unit 41 and is configured to have, for example, a display device and a touch panel. The storage 43 is configured to include a main memory and an auxiliary memory, like the storage 302 of the server 300. User information of the user 10 that has the mobile terminal 40 is stored in the storage 43. Note that the user information is registered beforehand by a prescribed application. The position detection unit 44 is a functional unit for detecting a position of the mobile terminal 40 and is formed to have, for example, a GPS device.

Although the vehicle-mounted apparatus 510 has, as functional units, a communication unit 511, a position detection unit 512, and a storage 513, the vehicle-mounted apparatus 510 may have a functional unit other than the units. The communication unit 511 is a interface for connecting the vehicle 500 to a network and is configured to include, for example, a network interface board and a wireless communication circuit for wireless communication. The position detection unit 512 is a functional unit for detecting a position of the vehicle 500 and is formed to have, for example, a GPS device. The storage 513 is configured to include a main memory and an auxiliary memory, like the storage 102 of the server 300. Vehicle information for identification of the vehicle 500 is stored in the storage 513. Note that the vehicle information is registered beforehand by a prescribed application. The vehicle-mounted apparatus 510 also has a function of controlling running of the vehicle 500, and the vehicle 500 is configured to be capable of automated running under running control by the vehicle-mounted apparatus 510. Note that the automated running function can be implemented by an existing technique.

Figure 11:
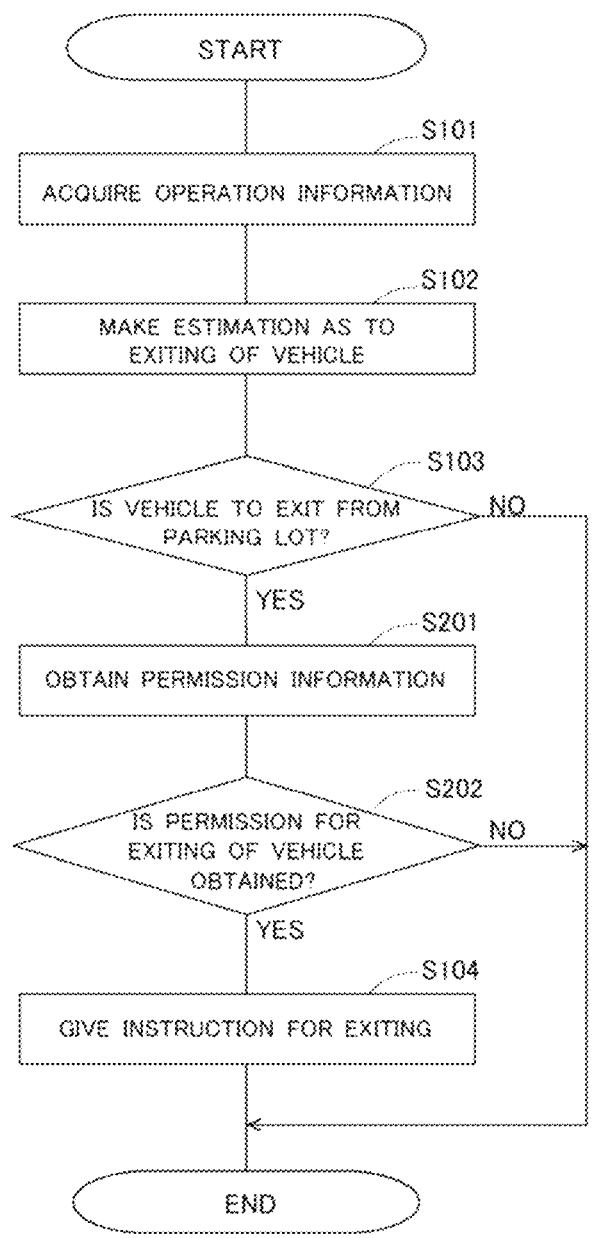
FIG. 11 is a flowchart of a process which the server performs in order to cause the vehicle to exit, according to the first modification of the first embodiment.

FIG. 11 is a flowchart of a process which the server 300 according to the present modification performs in order to cause the vehicle 500 to exit. The process is executed by the controller 303 of the server 300. Note that, of the processes illustrated in FIG. 11, virtually identical ones to those illustrated in FIG. 8 are denoted by identical reference numerals and that a detailed description thereof will be omitted.

In the present modification, if YES. in the process in S103, exiting information on exiting of the vehicle is transmitted to the mobile terminal 40 of the user 10 of the vehicle 500, and permission information from, the, user 10 which is a response to the exiting information is acquired, in next S201. This will be described with reference to FIG. 12.

Figure 12:
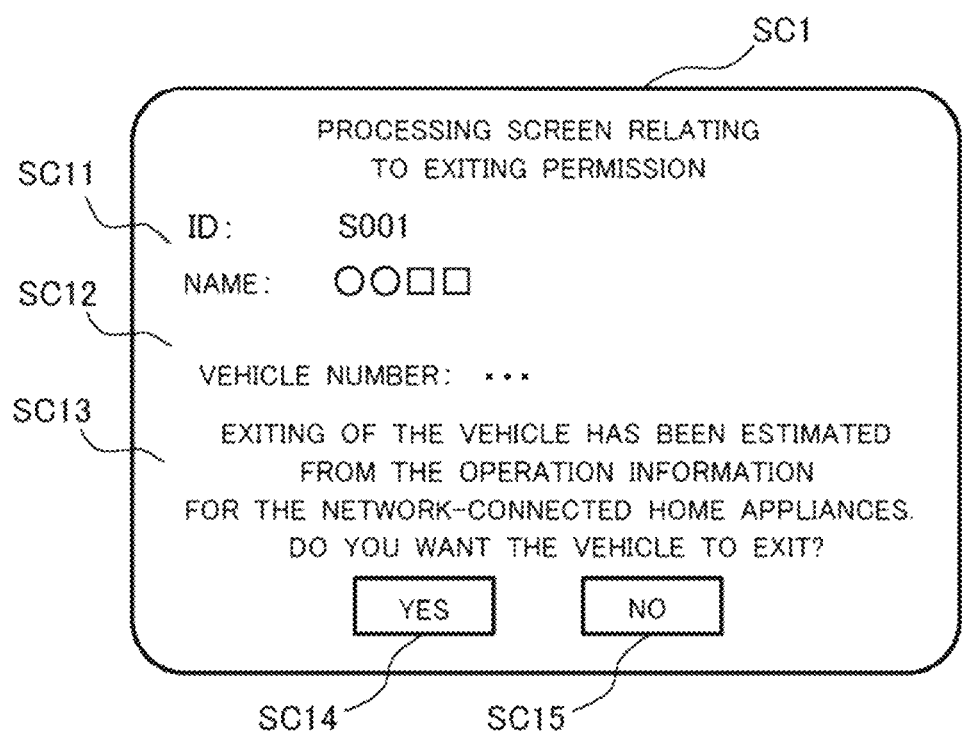
FIG. 12 is a view illustrating by example a processing screen relating to permission for exiting of the vehicle.

FIG. 12 is a view illustrating by example a processing screen relating to permission for exiting of the vehicle 500. A processing screen SC1 illustrated in FIG. 12 is a screen for acquiring permission information on whether exiting of the vehicle 500 is permitted by the user 10 and is displayed on the I/unit 42 of the mobile terminal 40 that the user 10 has. User information SC11 (an ID and a name), a vehicle number SC12, exiting information SC13 on exiting of the vehicle 500, a permit button SC14 with the label "YES," and a cancel button SC15 with the label "NO" are displayed on the processing screen SC1. When the permit button SC14 is pressed by the user 10, permission for exiting of the vehicle 500 is deemed to be given the user 10, and permission information is transmitted from the communication unit 41 of the mobile terminal 40 to the server 300. The controller 303 of the server 300 acquires permission. information from the user 10 in the above-described manner.

In next S202, it is judged whether permission for exiting of the vehicle 500 is obtained in the process in S201. If YES in S202, the process advances to S104. If NO in S202), execution of the present flow is ended. If YES in S202, an exit instruction for causing the vehicle 500 to exit is issued to the management apparatus 100 in next S104. With the issuance, the vehicle 500 is caused to exit from the parking lot 50 through automated running, and the vehicle is stopped at an intended position for getting on for the user 10. This will be described with reference to FIG. 13.

Figure 13:
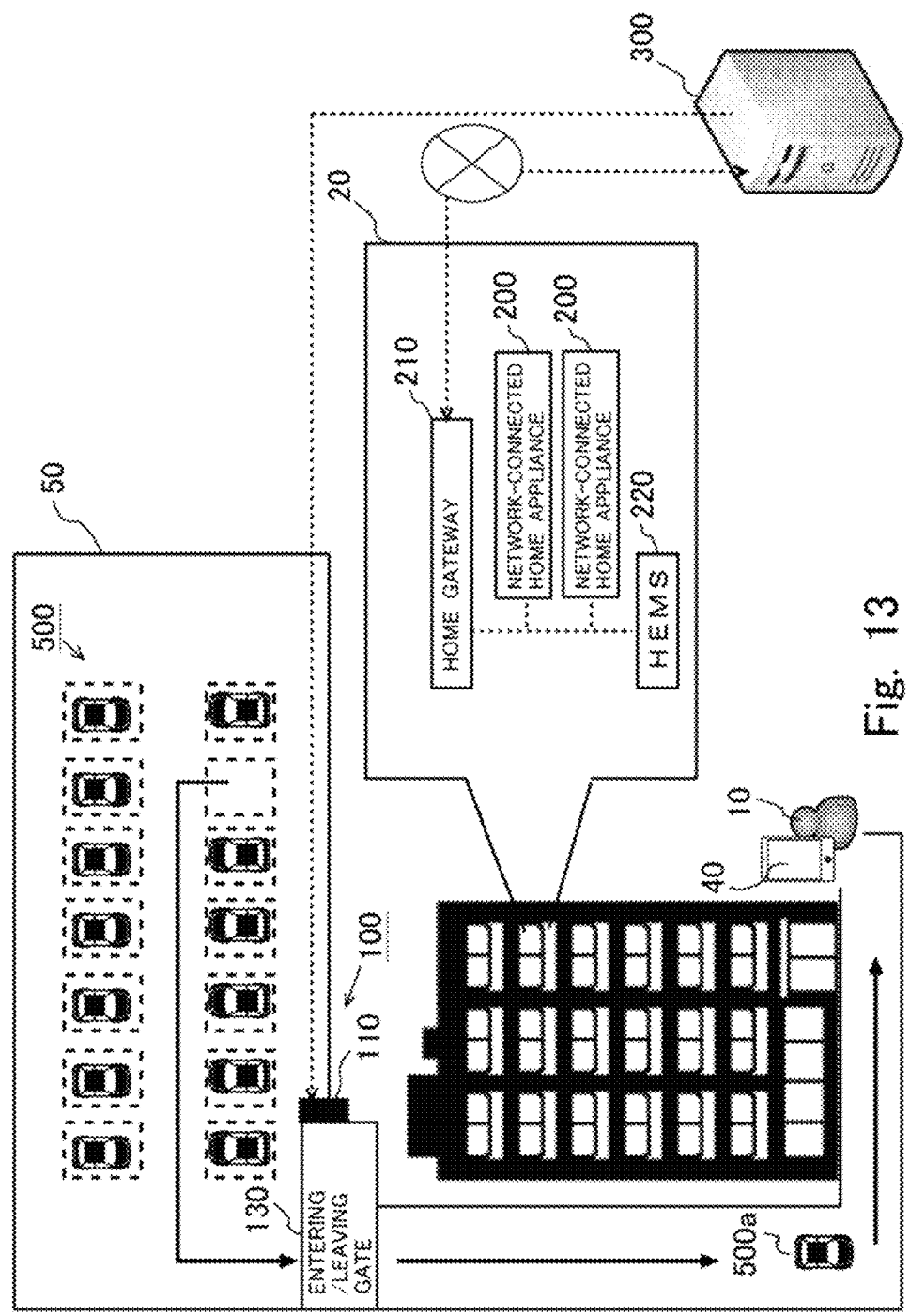
FIG. 13 is a diagram for explaining a process which the management apparatus after reception of an exit instruction from the server performs in order to cause the vehicle to exit, according to the first modification of the first embodiment.

FIG. 13 is a diagram for explaining a process which the management apparatus 100 after reception of an exit Instruction from the server 300 perform in order to cause the vehicle 500 to exit, according to the present modification. When the management apparatus 100 receives an exit instruction from the instruction unit 3033 that the controller 303 of the server 300 has, the management apparatus 100 accesses the vehicle-mounted apparatus 510 of the vehicle 500a via the communication unit 111 of the parking lot terminal 110 and issues an instruction for causing the vehicle 500a to run automatedly to the intended position for getting on for the user 10. Here, the management apparatus 100 according to the present modification is configured to include the parking lot terminal 110 and an entering/leaving gate 130. When the vehicle 500a is caused to exit from the parking lot 50, the entering/leaving gate controlled by the parking lot terminal 110, thereby allowing exiting of the vehicle, 500a. As illustrated in FIG. 13, the vehicle 500a that is caused to exit from the parking lot 50 through the entering/leaving gate 130 is caused to run automatically to the intended position for getting on for the user 10. The above-described issuance, of the exit instruction for causing the vehicle 500a to run by itself to the intended position for getting on for the user 10, by the server 300 allows the user 10 to get on the vehicle 500a without going over to the parking lot 50 Note that the above-described intended position for getting on is provided, for example, near an entrance of the multiple dwelling house that is a collection of dwelling houses 20.

The above-described processing makes a time period which the user spends in causing the vehicle 500 to exit from the parking lot 50 as short as possible and thus enhances user convenience for exiting of a vehicle from a parking lot.

<Second Modification of First Embodiment>

A second modification of the above-described first embodiment will he described with reference to FIG. 14. The vehicle 500 according to the present modification here is an electric motor which includes a battery and an electric motor and runs on driving force from the electric motor supplied with power from the battery. The vehicle 500 is provided with an SOC sensor which detects an SOC (State of Charge) value that is a value correlated with a charging state of the battery.

Figure 14:
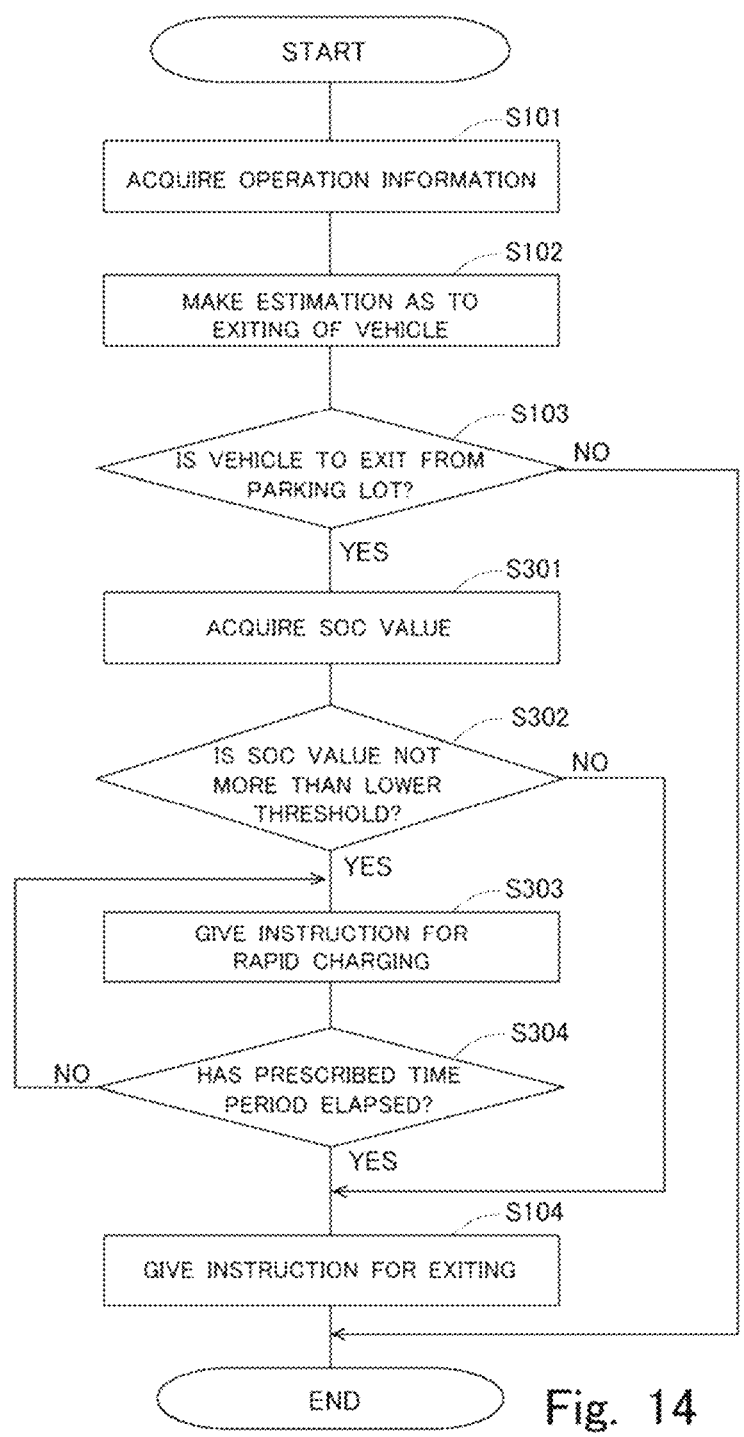
FIG. 14 is a flowchart of a process which the server performs in order to cause the vehicle to exit, according to a second modification of the first embodiment.

FIG. 14 is a flowchart of a process which the server 300 according to the present modification performs in order to cause the vehicle 500 to exit. The process is executed by the controller 303 of the server 300. Note that, of processes illustrated in FIG. 14, virtually identical ones to those illustrated in FIG. 8 are denoted by identical reference numerals and that a detailed description thereof will be omitted.

In the present modification, if YES in the process in S103, an SOC value of the battery of the vehicle 500 is acquired in next S301. The controller 303 acquires the SOC value of the battery of the vehicle 500 by acquiring data on the SOC value that is detected by the SOC sensor and transmitted from the communication unit 511 of the vehicle-mounted apparatus 510. It is judged in S302 whether the SOC value acquired in the process in S301 is not more than a prescribed lower threshold. The prescribed lower threshold here is a threshold which is determined in advance in view of, for example, a distance which can be traveled with power from the battery, the standpoint of battery protection and the like. The controller 303 makes the judgment by comparing the threshold determined in advance in the above-described manner with the SOC value acquired in the process in S301. If YES in S302, the process advances to S303. If NO in S302, the process advances to S104.

If YES in S302, a charge instruction for rapidly charging the battery of the Vehicle 500 is issued to the management apparatus 100 in next S303. Assume here that the vehicle 500 is parked at a vehicle charging station in the parking lot 50 and has experience in being subjected to normal charging processing before execution of the process in S303. Also, assume that the charging processing is controlled by the management apparatus 100. In this case, the management apparatus 100 after reception of the charge instruction from the server 300 switches charging processing on the battery of the vehicle 500 from normal charging to rapid charging. Note that the charging processing switching can be implemented by an existing technique.

If the vehicle 500 is not parked at a charging station, the management apparatus 100 after reception of the charge instruction from the server 300 may execute charging processing for rapid charging after moving the vehicle 500 to the charging station. In this case, for example, if the parking lot 50 is a mechanical parking lot which is provided in a basement of a multiple dwelling house that is a collection of dwelling houses 20, the management apparatus 100 may move the vehicle 500 to a charging station by controlling the vehicle transport mechanism 120. For example, if the vehicle 500 is configured to be capable of automated running in the parking lot 50 that is provided on the ground, the management apparatus 100 may move the vehicle 500 to a charging station by issuing a move instruction to the vehicle-mounted apparatus 510 of the vehicle 500. When the process in S303 ends, the process advances to S304

It is judged in S304 whether a prescribed time period has elapsed since the start of rapid charging in the process in S303. The prescribed time period here is a time period which is determined in advance in accordance with the SOC value of the battery before the rapid charging. If YES in S304. the process advances to S104, and the rapid charging is ended. If NO in S304, the process returns to S303 to continue the rapid charging.

According to the above-described processing, if the SOC value of the battery of the vehicle 500 is not more than the prescribed lower threshold, the battery is rapidly charged before the vehicle 500 is caused to exit from the parking lot 50. This mitigates a situation where the user 10 is unable to move in the vehicle 500 due to a low SOC value of the battery as much as possible and thus enhances user convenience for exiting of a vehicle from a parking lot.

Note that, in the above-described process in S303, the controller 303 may issue a charge instruction for rapidly charging the battery of the vehicle 500 to the management apparatus 100 and issue a control instruction for controlling a prescribed one of the network-connected home appliances 200 provided in the dwelling house 20. In this case, for example, the controller 303 may send to a television in a living room which is included in the network-connected home appliances 200, a control instruction for turning on the television and displaying a program which suits tastes of the user 10 as a recommendation on a screen via the home gateway 210. If the control encourages the user 10 to watch the television, the user 10 can be delayed from leaving home. As a result, a time period for charging the battery of the vehicle 500 is more likely to be secured. Note that, in this case, the television in the living room corresponds to a second home appliance according to the present disclosure.

<Second Embodiment>

A second embodiment will be described with reference to FIG. 15, above first embodiment has described an example where the vehicle 500 is caused to exit from the mechanical parking lot 50 provided in the basement of the multiple dwelling house that is a collection of dwelling houses 20. In contrast, the present embodiment will describe, an example where a vehicle 500 is caused to enter into a parking lot 50 as described above.

Figure 15:
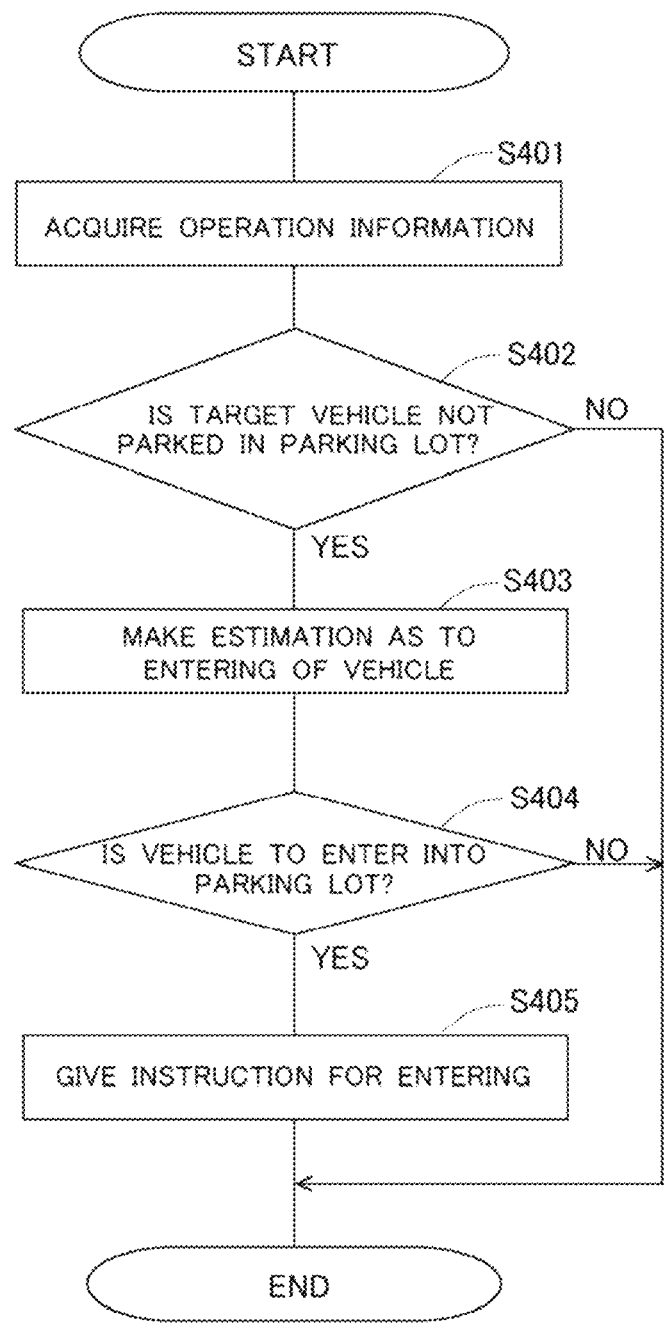
FIG. 15 is a flowchart of a process which a server performs in order to cause a vehicle to enter, according to a second embodiment.

FIG. 15 is flowchart of a process which a server 300 according to the second embodiment performs in order to cause the vehicle 500 to enter. The process is executed by a controller 303 of the server 300.

First, in S401, pieces of operation information for network-connected home appliances 200 are acquired. Here, an acquisition unit 3031 which the controller 303 of the server 300 has may acquire the pieces of operation information for the network-connected home appliances 200 on the basis of pieces of information which are transmitted from the network-connected home appliances 200 and a HEMS 220 via a home gateway 210 or may acquire the pieces of operation information for the network-connected home appliances 200 on the basis of information which is transmitted from a prescribed controller available for manipulation of the network-connected home appliances 200 via the Internet. In this case, the controller is composed of a mobile terminal 40 which a user 10 has. The network-connected home appliances 200 to be manipulated by the mobile terminal 40 are registered in a storage 43 of the mobile terminal 40, and the user 10 can input information on an instruction for manipulation addressed to the network-connected home appliance 200 with an I/O unit 42. Alternatively, the controller may composed of a vehicle-mounted apparatus 510 of the vehicle 500. In this case as well, the network-connected home appliances 200 are registered in a storage 513 of the vehicle-mounted apparatus 510, and the user 10 can input information on an instruction for manipulation addressed to the network-connected home appliance 200 using a prescribed input device (including, for example, a touch panel of a navigation system, a microphone, and the like) which the vehicle-mounted apparatus 510 has. This allows manipulation of the network-connected home appliance 200 using the mobile terminal 40 or the vehicle-mounted apparatus 510, and the user 10 can activate in advance the network-connected home appliance 200 on the way home, i.e., on the way to a dwelling house 20 in the vehicle 500. The controller 303 after reception of the pieces of operation information stores the pieces of operation information in a storage 302 of the server 300. When the process in S401 ends, the process advances in S402.

It is judged in S402 whether a target vehicle is not parked in the parking lot 50. The target vehicle in this case is the vehicle 500 of the user 10 after manipulation of the network-connected home appliance 200 that is a target of the process in S401. The controller 303 can make the above-described judgment by acquiring a status of parking of the vehicle 500 in the parking lot 50 from the management apparatus 100 for the parking lot 50. If YES in S402, the process advances to S403. If NO in S402, execution of the present flow is ended.

If YES in S402, an estimation as to entering of the vehicle 500 into the parking lot 50 is made on the basis of the pieces of operation information acquired in the process in S401 and a pattern of manipulation of the network-connected home appliances 200 which is stored in the storage 302 in next S403, and it is judged in next S404 whether it is estimated in the process in S403 that the vehicle 500 is to enter into the parking lot 50. The pattern of manipulation here is a pattern of manipulation of the network-connected home appliances 200 to be performed before coming home by the user 10. An estimation unit 3032 which the controller 303 of the server 300 has can estimate whether the vehicle 500 is to enter into the parking lot 50 by checking the pieces of operation information acquired in the process in S401 against the pattern of manipulation stored in the storage 302. This will be described with reference to FIG. 16.

FIG. 16 is a view illustrating by example pieces of operation information for the network-connected home appliances 200 which are acquired by the network-connected unit 3031 and stored in the storage 302. In the example in FIG. 16, manipulation of turning on an air conditioner in a living room which is included in the network-connected home appliances 200 has been performed on this occasion by the user 10. Note that the activation of the network-connected home appliance 200 may be executed in accordance with an activate instruction which is transmitted from the mobile terminal 40 of the user 10 or may be executed in accordance with an activate instruction which is transmitted from the vehicle-mounted apparatus 510 of the vehicle 500. Assume here that, for example, a pattern in which the air conditioner in the living room is turned on is stored as the pattern of manipulation of the network-connected home appliances 200 to be performed before coming home by the user 10, in this case, the estimation unit 3032 regards the pieces of operation in illustrated in FIG. 16 as fitting the pattern of manipulation and estimates that the vehicle 500 is to enter into the parking lot 50. Note that, in this case, the air conditioner in the living room, corresponds to a third home appliance according to the present disclosure. If YES in S404, the process advances to S405. If NO in S404, execution of the present flow is ended.

If YES in. S404, an enter instruction for causing the vehicle 500 to enter is issued to a management apparatus 100 in next S405. The management apparatus 100 then controls a vehicle transport mechanism 120 via a parking lot terminal 11-, thereby creating a state on standby for entering of the vehicle 500 in the parking lot 50. The state on standby for entering of the vehicle 500 in the parking lot 50 here refers to, for example, a state where a storage shelf which is assigned to the vehicle 500 in the packing lot 50 is transported to a waiting space immediately below a place for getting on and off on the ground using the vehicle transport mechanism 120. That is, if the state on standby for entering of the vehicle 500 is created in the parking lot 50, the vehicle 500 can be immediately transported from the place for getting on and off on the ground to the parking lot 50 in a basement.

The above-described processing makes a waiting time period for the user 10 when the vehicle 500 is caused to enter into the parking lot 50 as short as possible and thus enhances user convenience for entering of a vehicle into a parking lot.

<Modification of Second Embodiment>

A modification of the above-described second embodiment will be described with reference to FIG. 17.

The vehicle 500 according to the present modification here is an electric automobile which includes a battery and an electric motor and runs on driving force from the electric motor supplied with power from the battery. The vehicle 500 is provided with an SOC sensor.

Figure 17:
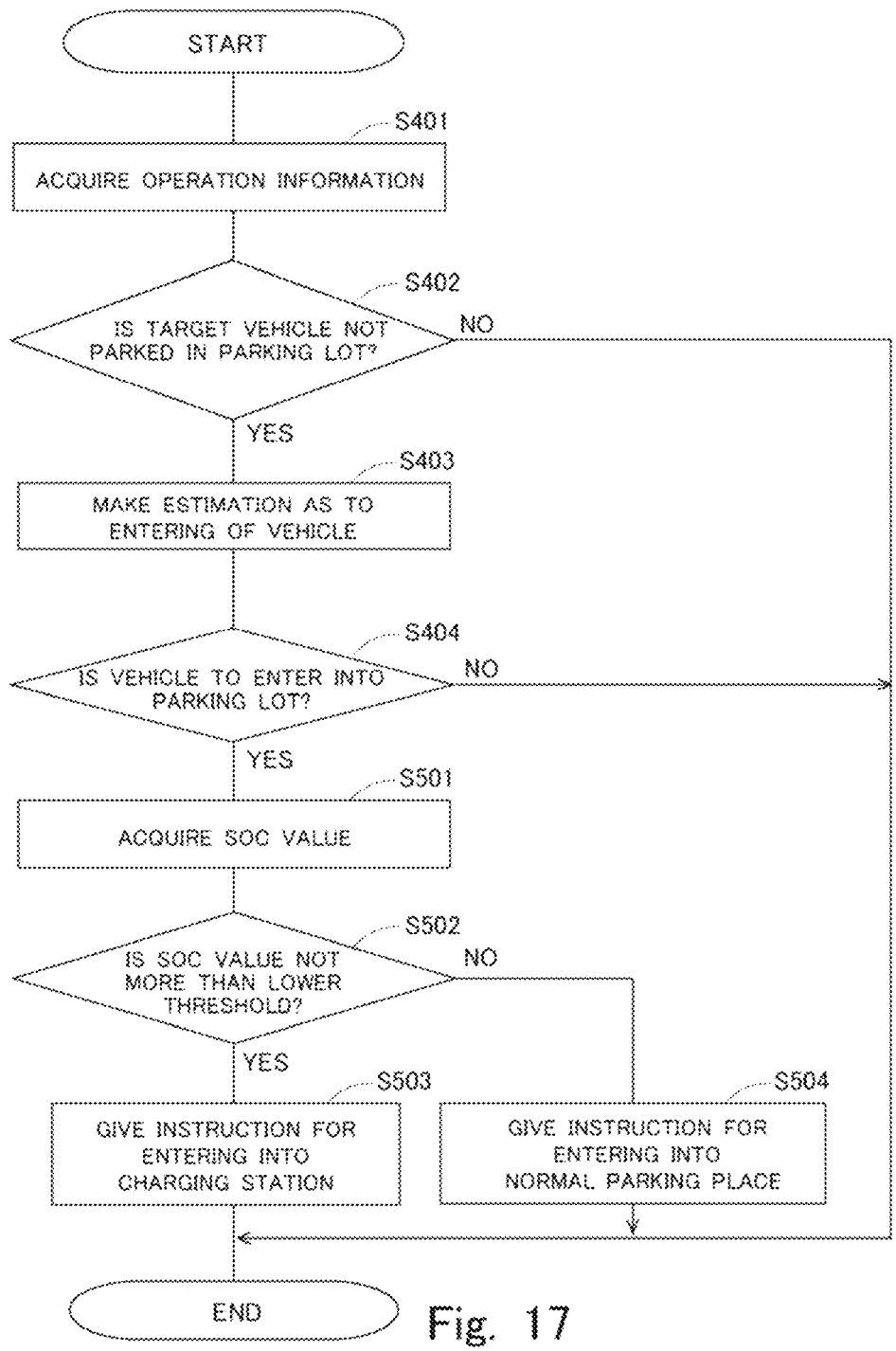
FIG. 17 is a flowchart of a process which the server performs in order to cause the vehicle to enter, according to a modification of the second embodiment.

FIG. 17 is a flowchart of a process which the server 300 according to the present modification performs in order to cause the vehicle 500 to enter. The process is executed by the controller 303 of the server 300. Note that, of processes illustrated in FIG. 17, virtually identical ones to those illustrated in FIG. 15 are denoted by identical reference numerals and that a detailed description thereof will be omitted.

In the present modification, if YES in the process in S404, an SOC value of the battery of the vehicle 500 is acquired in next S501. Note that the process in S501 is virtually identical to the process in S301 illustrated in FIG. 14 described above. It is judged in S502 whether the SOC value acquired in the process in S501 is not more than a prescribed lower threshold. The prescribed lower threshold here is a threshold which is determined in advance in view of, for example, a distance which can be traveled with power from the battery and the standpoint of battery protection. The controller 303 makes the judgment by comparing the threshold with the SOC value acquired in the process in S501. If YES in S502, the process advances to S503. If NO is S502, the process advances to S504.

If YES in S502, an instruction for causing the vehicle 500 to enter into a prescribed charging station in the parking lot 50 is issued to the management apparatus 100 in next S503. In this case, for example, if the parking lot 50 is a mechanical parking lot which is provided in a basement of a multiple dwelling house that is a collection of dwelling houses 20, the management apparatus 100 can move the vehicle 500 to a charging station in the mechanical parking lot by controlling the vehicle transport mechanism 120.

If NO in S502, an enter instruction for causing the vehicle 500 to enter into a normal parking place is the parking lot 50 is issued to the management apparatus 100 in next S504. The normal parking place here refers to a storage shelf which is assigned to the vehicle 500 in the parking lot 50, for example, if the parking lot 50 is a mechanical parking lot which is provided in a basement of a multiple dwelling house that is a collection of dwelling houses 20.

According to the above-described processing, if the SOC value of the battery of the vehicle 500 is not more than the prescribed lower threshold, the vehicle 500 after entering into the parking lot 50 is charge. This mitigates a situation where the user 10 is unable to move in the vehicle 500 due to a low SOC value of the battery when the vehicle 500 is caused to exit from the parking lot 50 on the next occasion as much as possible. As a result, convenience is enhanced.

<Other Embodiments>

The embodiments described above are merely examples, and the present disclosure may be changed and implemented as appropriate within the scope of the disclosure. Furthermore, processes and means described in the present disclosure may be freely combined to the extent that no technical conflict exists.

Furthermore, a process that is described to be performed by one apparatus may be shared and performed by a plurality of apparatuses. Processes described to be performed by different apparatuses may be performed by one apparatus. Which function is to be implemented by which hardware configuration (server configuration) in a computer system may be flexibly changed.

The present disclosure may also be implemented by supplying computer programs for implementing the functions described in the embodiments described above to a computer, and by one or more processors of the computer reading out and executing the programs. Such computer programs may be provided to the computer by a non-transitory computer-readable storage medium that can be connected to a system bus of the computer, or may be provided to the computer through a network. The non-transitory computer-readable storage medium may be any type of disk including magnetic disks (floppy (registered trademark) disks, hard disk drives (HDDs), etc.), and optical disks (CD-ROMs, DVD discs, Blu-ray discs, etc.), and any type of medium suitable for storing electronic instructions, such as read-only memories (ROMs), random access memories (RAMS) EPROMs, EEPROMs, magnetic cards, flash memories, or optical cards.

What is Claimed is:

1. An information processing apparatus comprising one or more processors configured to execute:
    acquiring operation information for at least one network-connected home appliance that is home electronic equipment which is provided in a dwelling house, and is accessible to a home network and is capable of being controlled via the network;
    acquiring a status of parking of a vehicle utilized by a user of the dwelling house in a parking lot associated with the dwelling house from a management apparatus for the parking lot, the management apparatus managing entering/exiting of the vehicle which is parked in the parking lot;
    making an estimation as to entering/exiting of the vehicle into/from the parking lot based on the operation information for the at least one network-connected home appliance in the dwelling house and based on the status of parking of the vehicle; and
    issuing, to the management apparatus, an enter/exit instruction for causing the vehicle to enter or exit based on the estimation as to the entering/exiting of the vehicle into/from the parking lot; wherein
    the at least one network-connected home appliance includes an air conditioner and a light in a living room and the at least one network-connected home appliance is accessible to the home network, to which a plurality of network-connected home appliances are connected, and the home network is accessible to an Internet,
    the one or more processors:
        acquire pieces of operation information for the plurality of network-connected home appliances connected to the home network by accessing the home network via the Internet based on a status of manipulation of the at least one network-connected home appliance by the user, and
    the making the estimation as to entering/existing of the vehicle into/from the parking lot comprises:
        estimating that the vehicle is to exit from the parking lot based on the status of the parking of the vehicle indicating that the vehicle is parked in the parking lot, and based on the operation information indicating that the air conditioner and the light are stopped; and
        estimating that the vehicle is to enter into the parking lot based on the status of the parking of the vehicle indicating that the vehicle is not parked in the parking lot, and based on the operation information indicating that the light is activated.

2. The information processing apparatus according to claim 1, wherein the controller one of more processors acquire the status of manipulation on the basis of detection information from a first sensor that is provided in a prescribed controller which allows manipulation of the at least one network-connected home appliance by the user.

3. The information processing apparatus according to claim 1, wherein the controller one of more processors acquire the status of manipulation on the basis of detection information from a second sensor that monitors power consumption of the at least one network-connected home appliance.

4. The information processing apparatus according to claim 1, wherein
    the one or more processors make the estimation as to entering/exiting of the vehicle on the basis of a tendency, that is learned on the basis of past information, and current operation information for the at least one network-connected home appliance, wherein the tendency represents association between the operation information for the at least one network-connected home appliance and information on entering/exiting of the vehicle.

5. The information processing apparatus according to claim 1, wherein
    the one or more processors transmit entering/exiting information on entering/exiting of the vehicle to a mobile terminal of the user if enter/exiting of the vehicle into/from the parking lot is estimated.

6. The information processing apparatus according to claim 5, wherein
    the one or more processors transmit entering/exiting information on entering/exiting of the vehicle to a mobile terminal of the user if entering/exiting of the vehicle into/from the parking lot is estimated.

7. The information processing apparatus according to claim 1, wherein
    the management apparatus is an apparatus including a vehicle transport mechanism that is provided in a mechanical parking lot which is the parking lot, and
    the one or more processors issue the enter/exit instruction including an instruction for activating the vehicle transport mechanism.

8. The information processing apparatus according to claim 1, wherein
the management apparatus is an apparatus that executes causing the vehicle to exit from the parking lot by causing the vehicle to run by itself, and the one or more processors issue the enter/exit instruction including an instruction for causing the vehicle to run by itself to an intended position for getting on the vehicle for the user if exiting of the vehicle from the parking lot is estimated.

9. The information processing apparatus according to claim 1, wherein
the vehicle is an electric automobile that includes a battery and an electric motor and runs on driving force from the electric motor supplied with power from the battery, and
the one or more processors issue a charge instruction for rapidly charging the battery to the management apparatus if it is estimated that the vehicle is to exit from the parking lot, and an SOC value that is a value correlated with a charging state of the battery is not more than a prescribed lower threshold.

10. The information processing apparatus according to claim 9, wherein
the one or more processors issue a control instruction for controlling a prescribed second home appliance of the at least one network-connected home appliance together with the charge instruction.

11. The information processing apparatus according to claim 1, wherein
the air conditioner is activated in accordance with an activate instruction that is transmitted from a mobile terminal of the user.

12. The information processing apparatus according to claim 1, wherein
the air conditioner is activated in accordance with an activate instruction that is transmitted from a vehicle-mounted apparatus of the vehicle.

13. The information processing apparatus according to claim 1, wherein
the vehicle is an electric automobile that includes a battery and an electric motor and runs on driving force from the electric motor supplied with power from the battery, and
the one or more processors issue, as the enter/exit instruction, an instruction for causing the vehicle to enter into a prescribed charging station in the parking lot if entering of the vehicle into the parking lot is estimated, and an SOC value that is a value correlated with a charging state of the battery is not more than a prescribed lower threshold.

14. An information processing method, the method comprising executing by one or more processors of a computer:
acquiring operation information for at least one network-connected home appliance that is home electronic equipment which is provided in a dwelling house, and is accessible to a home network and is capable of being controlled via the network;
acquiring a status of parking of a vehicle utilized by a user of the dwelling house in a parking lot associated with the dwelling house from a management apparatus for the parking lot, the management apparatus managing entering/exiting of the vehicle which is parked in the parking lot;
making an estimation as to entering/exiting of the vehicle into/from the parking lot based on the operation information for the at least one network-connected home appliance in the dwelling house and based on the status of parking of the vehicle; and
issuing, to the management apparatus, an enter/exit instruction for causing the vehicle to enter or exit based on the estimation as to the entering/exiting of the vehicle into/from the parking lot; wherein
the at least one network-connected home appliance includes an air conditioner and a light in a living room and the at least one network-connected home appliance is accessible to the home network, to which a plurality of network-connected home appliances are connected, and the home network is accessible to an Internet;
the method further comprising executing by the one or more processors:
acquiring pieces of operation information for the plurality of network-connected home appliances connected to the home network by accessing the home network via the Internet on the basis of a status of manipulation of the at least one network-connected home appliance by the user, and
the making the estimation as to entering/existing of the vehicle into/from the parking lot comprises:
estimating that the vehicle is to exit from the parking lot based on the status of the parking of the vehicle indicating that the vehicle is parked in the parking lot, and based on the operation information indicating that the air conditioner and the light are stopped, and
estimating that the vehicle is to enter into the parking lot based on the status of the parking of the vehicle indicating that the vehicle is not parked in the parking lot, and based on the operation information indicating that the light is activated.

15. A non-transitory storage medium storing an information processing program for causing one or more processors of a computer to execute:
acquiring operation information for at least one network-connected home appliance that is home electronic equipment which is provided in a dwelling house, and is accessible to a home network and is capable of being controlled via the network;
acquiring a status of parking of a vehicle utilized by a user of the dwelling house in a parking lot associated with the dwelling house from a management apparatus for the parking lot, the management apparatus managing entering/exiting of the vehicle which is parked in the parking lot;
making an estimation as to entering/exiting of the vehicle into/from the parking lot based on the operation information for the at least one network-connected home appliance in the dwelling house and based on the status of parking of the vehicle; and
issuing, to the management apparatus, an enter/exit instruction for causing the vehicle to enter or exit based on the estimation as to the entering/exiting of the vehicle into/from the parking lot; wherein
the at least one network-connected home appliance includes an air conditioner and a light in a living room and the at least one network-connected home appliance is accessible to the home network, to which a plurality of network-connected home appliances are connected, and the home network is accessible to an Internet,
the one or more processors:
acquire pieces of operation information for the plurality of network-connected home appliances connected to the home network by accessing the home network via the Internet based on a status of manipulation of the at least one network-connected home appliance by the user, and the making the estimation as to entering/existing of the vehicle into/from the parking lot comprises:
estimating that the vehicle is to exit from the parking lot based on the status of the parking of the vehicle indicating that the vehicle is parked in the parking lot, and based on the operation information indicating that the air conditioner and the light are stopped; and
estimating that the vehicle is to enter into the parking lot based on the status of the parking of the vehicle indicating that the vehicle is not parked in the parking lot, and based on the operation information indicating that the light is activated.

* * * * *